(12) United States Patent
Mullins et al.

(10) Patent No.: US 7,149,730 B2
(45) Date of Patent: *Dec. 12, 2006

(54) DYNAMIC CLASS INHERITANCE AND DISTRIBUTED CACHING WITH OBJECT RELATIONAL MAPPING AND CARTESIAN MODEL SUPPORT IN A DATABASE MANIPULATION AND MAPPING SYSTEM

(76) Inventors: Ward Mullins, 2222 Leavenworth St. Apt. 304, San Francisco, CA (US) 94133; Alexandre Martins, Rua Almirante Lamego 703 Apt. 102, Centro, Floianopolis SC (BR) 88015-600

(*) Notice: Subject to any disclaimer, the term of this patent is extended or adjusted under 35 U.S.C. 154(b) by 306 days.

This patent is subject to a terminal disclaimer.

(21) Appl. No.: 10/430,004

(22) Filed: May 5, 2003

(65) Prior Publication Data
US 2003/0208505 A1    Nov. 6, 2003

Related U.S. Application Data

(60) Provisional application No. 60/377,879, filed on May 3, 2002.

(51) Int. Cl.
G06F 17/30 (2006.01)

(52) U.S. Cl. .............................................. 707/2; 707/3

(58) Field of Classification Search ..................... 707/1, 707/3, 4, 5, 10, 100, 102, 103, 104.1, 2; 345/736; 711/141; 709/201, 203, 225, 251; 713/201; 717/108, 114, 162, 165
See application file for complete search history.

(56) References Cited

U.S. PATENT DOCUMENTS 6,754,670 B1 * 6/2004 Lindsay et al. ............. 707/100

OTHER PUBLICATIONS

BEA WebLogic Server 5.1 Documentation, copyright 2000, pp. 1-63.*

* cited by examiner

*Primary Examiner*—Apu M. Mofiz

(57) ABSTRACT

The present invention provides a system and method for dynamic object-driven database manipulation and mapping system which relates in general to correlating or translating one type of database to another type of database or to an object programming application. Correlating or translating involves relational to object translation, object to object translation, relational to relational, or a combination of the above. Thus, the present invention is directed to dynamic mapping of databases to selected objects. Also provided are systems and methods that optionally include caching components, security features, data migration facilities, and components for reading, writing, interpreting and manipulating XML and XMI data files.

16 Claims, 7 Drawing Sheets

Object Application with CocoBase and Relational DataSource

DYNAMIC CLASS INHERITANCE AND DISTRIBUTED CACHING WITH OBJECT RELATIONAL MAPPING AND CARTESIAN MODEL SUPPORT IN A DATABASE MANIPULATION AND MAPPING SYSTEM

This new application is for an Original (nonprovisional) filing, based on U.S. Provisional Application Ser. No. 60/377,879, filed May 3, 2002

TECHNICAL FIELD

The present invention relates in general to correlating or translating one type of database to another type of database or to an object programming application. Correlating or translating involves relational to object translation, object to object translation, relational to relational, or a combination of the above. Thus, the present invention is directed to dynamic mapping of databases to selected objects in a system that supports dynamic class inheritance and distributed caching with either or both of Object to Relational and Relational to Object mapping, and including Cartesian model mapping support and class inheritance model mapping support in a database manipulation and mapping system.

BACKGROUND ART

Computer databases or similar constructions (hereinafter referred to as data stores) are powerful tools for storage, organization, retrieval and other handling of various types of information. However, there are different database models, or formats, for data access that are incompatible with each other, and may also be incompatible with, or remarkably different from, an object programming application. In this respect, complex relationships between objects present in the object programming application may be entirely absent in a relational or object database being accessed or updated. Nonetheless, a plurality of these database types have achieved a high level of popularity and proliferation. The two most common database models are object and relational, and object programming models are frequently used for internet applications involving database accessing.

As an example of common object programming applications, the popular Java language with its server-side component, Enterprise Java Beans, is being widely used to support object model programming applications that access and use data from databases that have a JDBC driver. Thus, it is desirable to be able to adapt and use many of the traditional relational database tools, utilities, systems and corporate procedures with the newer object format of many more recent web-based applications. Since many users may be accessing a single application, there is a need for speeding up database accesses and for synchronizing object programming application transactions with database accesses and updates.

Systems for accessing data storage based upon objects have been used for many years to accommodate object-directed software applications. The most common conventional approach to accomplish access of data stores involves writing and imbedding custom access codes within an object application needing access to the data. This approach is generally limited to having custom codes capable of accessing only a single relational table within a relational database or similar construction, referred to as a data store. When an object model has been adapted specifically for accessing a single data store using the JDBC driver for that data store, moving data to a second database or accessing multiple databases can become very problematic and painful for a programming engineer who is assigned the responsibility for such a task.

The aforementioned conventional approach to bridging between object and relational models (or between object and multiple relational models) has frequently required "brute-force" hand-recoding of relational database access code. This approach can be very time-consuming and is prone to errors. This approach can also generate inefficient objects that require more processing time, storage space, and transfer time. Further, this approach does not scale well because each instance of relational access code must be converted manually, in turn, even if similar objects have already been applied for use with the converted relational data base.

As mentioned above, more efficient approaches sometimes use tools to automate the conversion process. However, the tools provided to date typically are not versatile enough to handle many types of conversion without manual coding or explicit defining of parameters by a human operator. Because of this requirement for operator participation in the translation, the conversion using today's tools still does not scale well and does not allow for fully automated and flexible conversion of data access between various data base models.

Further, this approach to conversions does not provide for communicating the conversions in an efficient manner as, for example, to other entities who may need the same type of conversion on similar data, or who may require the conversion to access the data in another way. In a distributed environment that may involve multiple users accessing multiple databases by multiple object applications, this can get exceeding complex. Another drawback of conventional systems and techniques (as understood in the conventional art), is that dynamic mapping of objects to multiple types of databases is virtually impossible, because the tailored hand code must be updated and recompiled. This may require that an application be stopped and restarted in order to implement mapping changes, i.e., the mapping changes are not dynamic.

Significant drawbacks are associated with using a relational database model in conjunction with an object programming model, but the relational database model is still the most widely accepted traditional format for reliable and quick access to data while using complex data search queries. This model allows the user to store data records and to access the data via a query language that uses relational expressions such as AND, OR, NOT, etc. Over the years, the vast majority of production databases have been relational databases, each having its own relational arrangement, and accessible by a particular query language. While convenient for set-up and arranging data, access is had only by those having substantial knowledge of the various relationships between pieces of data in the database.

JDBC drivers have been designed to formulate database specific SQL queries or statements from standard SQL strings passed to them by an object programming application. Ordinarily, such JDBC drivers are specific to a database, and separate statements and separate JDBC drivers must be utilized to access different databases. This is complicated by the fact that many object programming applications either do not permit simultaneous attachment to multiple databases or poorly coordinate transactions that impact multiple databases. Accordingly, relational databases can sometimes be awkward to access, and transferring data from one database to another database can be slow and painful, unless a specific transfer program has been specifically written or tailored to effect that specific transfer of data.

The object database model is a newer model that has rapidly increased in usage due to recent trends such as the world-wide-web and application service provider (ASP) architectures. Such object databases have sometimes been used as the primary source for accessing data, for example, Jasmine and ObjectStore are available from Computer Associates Intl., Inc. and Object Design Inc. (ODI), respectively. However, accessing data in such permanently stored object database has raised serious performance issues for larger applications when complex querying is required (as compared to relational databases). Complex querying is usually faster using relational databases since query engines may be more highly developed for relational database accesses.

Previously, object applications have tended to only use simple memory buffers with relational and object databases. Difficulties existed with using either an object database or a relational database to serve as a transient memory resident database "cache" (secondary database) to try to speed up database accesses. No commercially viable solutions have existed with acceptable performance.

There is a need for an object programming application to successfully access a secondary transient memory resident database, as either a relational database or an object database. In such a case, a dynamic database mapping tool would be necessary to provide the object programming application with a map or maps to both the primary and secondary databases in order to successfully implement a dynamic transient memory resident database. It would be particularly helpful in optimizing the performance of an object programming application if there could be provide a memory resident object database (or a resident portion thereof) as a cache for data retrieval. In such a case it might be possible to directly access (and perhaps re-use) data objects stored in the secondary transient resident memory database, including their metadata, instead of generating data objects from accessed data.

If it were possible to successfully provide a commercially viable secondary memory resident transient database, data being used by the object programming application would only need to be persisted back to one or more of a permanent storage relational database (primary database) when data has been created, inserted or updated. Ideally, the application would likewise update the memory resident object database (secondary database) when the primary database is updated. However, as mentioned such simultaneous access of multiple databases can give rise to transactional coordination problems, or to data synchronization problems.

Accordingly, intensely needed by many modern software application programs are systems for more efficient access and manipulation of data stores, systems having the flexibility and dynamic capability to attach data from a database to maps as objects and having the ability to map one or more databases to various objects in real time. A strong need exists for such systems that also permit a user to cleanly, transparently and synchronically transfer data between multiple data sources, while maintaining the ability for an object programming application to access or use such data in the system. The need exists for an improved database access buffering system, for object programming applications, having at least one transparent secondary memory resident database and a primary data source that can be simultaneously utilized in a synchronized and transaction coordinated manner.

SUMMARY OF THE INVENTION

Accordingly, it is an object of the present invention to overcome the drawbacks of the conventional art and achieve flexibility and dynamic operation in the accessing of databases that has not yet been achieved on a consistent basis while providing dynamic class or data persistence and/or dynamic object model navigation with distributed caching of a data source that uses a object to relational or a relational to object mapping respository.

It is another object of the present invention to provide a system for dynamically mapping data to objects for software applications, particularly at a system for mapping to an object for a software application during the run time of that application, in a system that provides dynamic persistence of data and navigation of an object model,.

It is an additional object of the present invention to provide easy translations between databases and applications having a variety of different formats or data store models, and to provide for class inheritance and Cartesian model support in a mapping system, preferably and particularly in a system that provides distributed caching of a datasource and/or of an object programming navigation model that is mapped to a datasource.

It yet another object of the present invention to provide a mapping system wherein multiple objects can be used for a particular map, and preferably providing parent-child two way navigation and inheritance as well as Cartesian model support in a mapping system.

It is still a further object of the present invention to provide a mapping system wherein multiple maps can be developed for a single object, for example in a parent-child inheritance situation where the object is populated by data present in both the parent class and child class maps, or the object is dynamically populated from multiple maps in a manner dictated by a Cartesian model.

It is again another object of the present invention to provide such a mapping system wherein different data attached to an object can be selected by means of different maps.

Another object of the present invention is to provide such a mapping system wherein object programming applications are tailored to delegate accessing a database and the generation of SQL strings to a runtime library repository, which repository can access the database directly or through a database driver, such as a JDBC driver, without the need to imbed specific database accessing mechanisms in the application code. It is a preferred object of the invention to provide such a system with a concurrent parameter setting mechanism where the runtime library repository can be set to access a particular database and to generate database specific database calls and SQL strings.

In one preferred object of the invention, in such a mapping system, is provided a software program or software module, such as an API, that can be optionally utilized when another software program or module is generating application programming code from database maps to provide a programming application that will delegate to a runtime library repository the functions of accessing a database and the generation of SQL strings that are specific to a database or JDBC driver.

In another preferred object of the invention, the runtime library repository can be modified and tailored to optimize database access calls and SQL strings for a particular database. Preferably, such repository supports both Cartesian models and Inheritance models for an object to relation, object to object or relational to object mapping system.

It is again another object of the present invention to provide a mapping system wherein data changes related to a particular object can be promulgated with global changes for that object, if desired. Particularly ideal is to provide for such global changes to a distributed cache or a distributed object model that is being used or navigated.

It is still a further object of the present invention to provide a mapping system when a data map for an object can be easily edited without extensive knowledge of the relational database as a source of the data.

It is again another object of the present invention to provide a mapping system wherein the metadata describing a map of a datastore can be dynamically evaluated or changed using a navigation object or set of navigation objects. Distributed caching of an object model to handle the existence of multiple object navigators is an ideal object of this invention.

It is again another object of the present invention to provide a mapping system, wherein data can be accessed more quickly than is possible with a conventional data store accessing arrangements.

It is again a further object of the present invention to provide a mapping system in which frequently-used data can be more easily accessed than other types of data.

It is yet a further object of the present invention to provide a mapping system in which a wide variety of different data languages can be easily used.

It is still a further object of the present invention to provide a mapping system wherein virtually any type of datastore architecture can be translated so as to be useful by an object software application, or other types of software applications.

It is again a further object of the present invention to provide a mapping system wherein datastore to datastore mapping is easily facilitated.

It is still another object of the present invention to provide a fully synchronized caching system that utilizes the transaction coordination facilities of a server such as a J2EE application server (for example, Weblogic 6.1), such system comprising a local or distributed computer system having a first data source referred to as the primary data source, a second data source referred to as the cache data source and the cache data source is associated with an object to relational mapping layer to provide a data source cache for object applications, and a server having a transaction coordinator with the ability to register multiple data sources, wherein:

(a) both the primary data source and the cache data source are registered with the transaction coordinator facilities of the server, and (b) the cache data source acts as secondary data source to speed up data accesses for an object application and the cache data is plugged into the object to relational mapping layer, and (c) registration of the cache data source with the transaction monitor of the server provides the feature that any changes to the cache will automatically be synchronized with the primary data source or record upon transaction completion, including commit or roll-back of changes for both data sources.

In a particularly preferred object of the invention the cache data source can be set up as a memory-resident entire database, a disk resident database, or both a memory resident database and disk resident which are synchronized. In one object, of the invention the memory resident database may be a portion of the disk resident database and the size of the memory for the memory resident database can be set by the user.

Another object of the present invention is to provide a database access repository, or a collection of repositories, comprising a runtime library repository having the ability to make database specific calls and to generate database specific SQL strings, and comprising other libraries, information and logic that permit mapping of information related to one or more of a member selected from the group consisting of relational databases, object databases and object programming schemas, and the like. The database access repository may contain one or more items selected from the group consisting of maps of database schemas, object definitions, other programming definitions or parameters, object metadata, database settings, complex relationship definitions. For example, metadata can be placed in a separate structure from the java object application and can be independently stored and accessed in a database access repository file collection, or in a separate file. In one preferred object of the invention, an object to relational repository can include a runtime library repository that can be optimized for a particular database and has the ability to access multiple database types, wherein the runtime library repository can be access by object programming applications that delegate database access and SQL string generation to the runtime library repository.

These and other objects and goals of the present invention are achieved by the present invention as described below, and depicted in FIG. 7.

In some objects of the present invention, concepts are based in part upon concepts present in U.S. Pat. No. 5,857,197, (incorporated herein by reference) or that are reasonably inferable from reviewing that patent, in order for the present invention to provide an improved mapping system for handling data requested by an object software application model in a manner that is compatible with relational data stores. A dynamic repository-based mapping system is used. The system does not put all of the data access code in java objects, for example metadata (data about Java objects including complex java objects that have relationships with other java objects) does not need to be stored in a java object. In a preferred aspect, it is an object of the present invention to provide a database access system that does permits a java object application to delegate database accesses to a runtime library repository.

In a preferred object of the present invention, a software programming module (or modules) can automatically generate object source code from at least one database schema map, at least one object programming application schema, or from a combination of at least one database schema map and at least one object programming application schema. The code generated for the application can be set to delegate database access and SQL string generation to the runtime library repository instead of including within the application the more limiting code for non-delegated database access by the application. This arrangement allows the mapping information and associated metadata to be easily accessed, changed and used to convert thousands of lines of code in a data object, as needed. The mapping information can be used to map from objects to relational models or vice versa and generate appropriate code.

DETAILED DESCRIPTION OF THE DRAWINGS

The following detailed description may utilized terms that are defined in the "Definitions" section which immediately follows this section.

Figure 1:
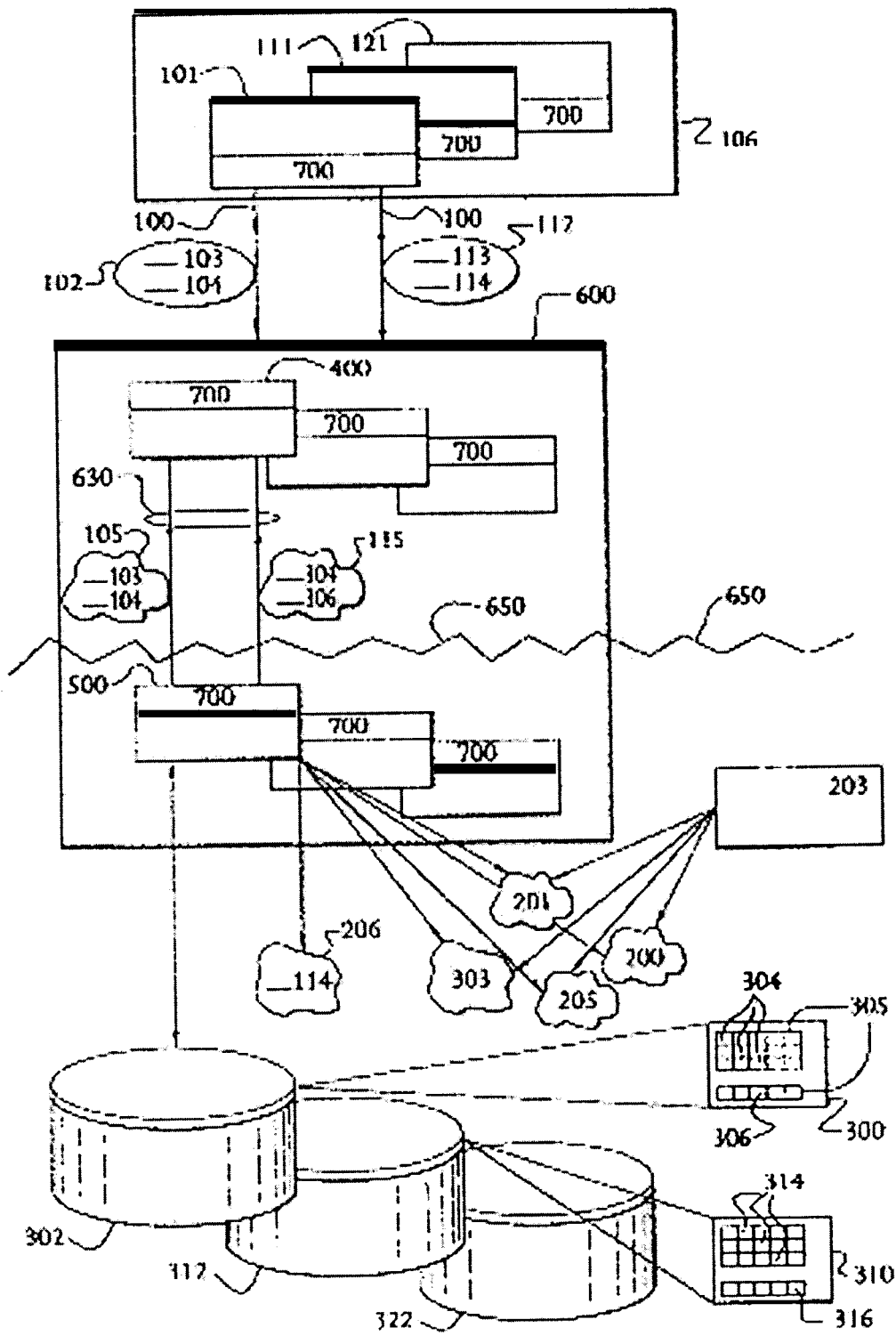
FIG. 1 and its description is a replication of FIG. 1 as shown and described in U.S. Pat. No. 5,857,197.

Detailed Description of FIG. 1

FIG. 1 illustrates one such embodiment involving a request 100 by an object application 101 and the processing of such request. The system according to one embodiment of the present invention comprises an object schema 200 including meta data 201 corresponding to a data store schema 300, a first adapter 400, and a second adapter 500. In the preferred embodiment of the subject invention the object application 101 is a java applet "cocodemo.java" as listed in Appendix A of U.S. Pat. No. 5,857,197 ('197 patent), issued Jan. 5, 1999.

One embodiment of the '197 patent invention used a user defined object view of an underlying non-object store, i.e. the object schema 200. The object schema 200 was accessed by an object application 101 through an abstract layer 600 which does the necessary conversions between object and non-object views. This abstraction allowed both kinds of data stores—object and non-object (e.g., relational)—to be accessed identically from at least one object application 101.

Moreover, by applying simple object streaming, the '197 patent invention was capable of accessing objects distributed over a three tier environment using exactly the same application program interface ("API") 700 as the local two-tier environment. This wa accomplished by using access "adaptive" technology comprising the adapter abstraction layer 600.

The adapter abstraction layer 600 of the '197 patent performs any translation work necessary for converting objects to both object data stores 312 and non-object data stores 302. The adapter abstraction layer 600 provided a consistent API 700 for both object and non-object data stores and enables application programmers to migrate between various object stores without application modification. The adapter abstraction layer 600 also facilitated communication with a remotely available second adapter 500 without modifying the object application 101 programming logic.

In one embodiment, the '197 patent includes the use of meta data 201 (i.e., data used to describe other data) to define how to access and convert non-object data store content 304 to objects and back. This was accomplished by paring down the non-object data store schema 300 into its various components including tables, fields, and conditions 305 in one embodiment. The paring made the creation, management, and access to the meta data 201 to be a convenient and elegant task. By using the adapter abstraction layer 600 which understands and uses the meta data 201, the '197 patent provided an abstract view of an underlying data store(s) 302 (312, 322) as an object store. The effected abstraction produced an architecture whereby the underlying data store(s) 302 (312) as well as multi-tier adapters (e.g., 400, 500, 4XX, and 5XX) could be interchanged without object application 101 code modification.

One embodiment of the '197 patent was implemented using the adapter technology and was therefore capable of being deployed as either a 2-tier or as a 3-tier environment transparently. The adapter abstraction layer 600, and more specifically the first adapter 400, communicated with a server process, more specifically the second adapter 500, in communication with the underlying data store 302, which transferred the requested data store content 304 to and from the first adapter 400 in communication with object application 101 client. The first adapter 400 instantiated the object 112 from more primitive data types comprising data 115, reflecting the data store content 304 obtained from the server process, more specifically the second adapter 500. The method of breaking down objects 102 (112) into the corresponding primitive types comprising data 105 (115) ensured successful transfers of any kind of object irrespective of object application 101 views of the object(s)' data elements. The '197 patent invention used the adapter technology to dynamically load data store access code 205 at runtime. This architecture requires objects to serialize themselves in order to be persistable or for the computer language and language runtime to be able to inspect and set an object's structure in such a way as to be able to automatically persist the object's contents. Persistable is a term of art which means an object's contents can be saved to some more permanent location such as a computer disk, and in this case refers to the storage and retrieval of the object's contents from a data store. As a result, the present invention can readily adapt to an N-tier adapter solution which accesses the data store through some intermediate data server, thereby increasing deployment and scalability options.

FIG. 1 of the '197 patent shows one embodiment of the '197 patent invention which worked in conjunction with an object schema manager 203. The object schema manager 203 allowed data store administrators to create and maintain an object view of data store content 301 stored in the data store 302. The object schema manager 203 could read, write, and update the meta data 201. One embodiment of the '197 patent invention was directed to accessing non-object (e.g., relational) data stores 302, creating meta data 201 based on data store schema 300 comprising tables, fields and clauses or conditions 305, making up the data store 302. One such embodiment of the '197 patent comprised a set of tools which were designed to create and maintain the meta data 201 by storing the information in a repository (such as the data store 302 itself), which information was then loaded by the second adapter at runtime. This meta data 201 then served as a map for operations available on the data store(s) 302 (312), for the way these operations should be performed and under what conditions.

FIG. 1 of the '197 patent further illustrated how the object schema manager 203 facilitates the creation and maintenance of the object schema 200, thereby increasing productivity and reducing the opportunities for typographical errors, which can create preventable runtime errors. The object schema manager 203 permitted dynamic modification of object schema 200 without requiring modification or recompile of the object application 101 to ensure that the object application clients were not 'brittle' or limited to a particular database or object model as is traditionally the case in data store access applications. One embodiment of the '197 patent used the meta data 201 to construct an object view of the data store schema 300, e.g., an object schema 200, and used the meta data 201 to generate one or more commands 303 for accessing the data store content 304. The deployment of meta data 201 in this way in one embodiment had the effect of using the non-object data store(s) 302 to be described and accessed as object(s) 102, though its contents might have been more rudimentary and abstract.

One embodiment of the '197 patent stored meta data 201 in a data store 204 and dynamically loaded and executed meta data 201 at runtime. As a result, in one embodiment of the '197 patent, access code 205 corresponding to the command(s) 303 is centrally created and managed in a central repository, i.e., data store 204. Such central repository architecture allowed the object schema(s) 200 to be re-used across objects 102 (112) and object applications 101 (111, 121). Such an approach also allowed for any changes of one object schema 200 to be transparently reflected to any client object application 101 accessing and using the object schema 200, without the need for object application 101 modification or recompilation. The '197 patent contemplated a notification mechanism so that data store 302 modifications resulting from requests in one location could be immediately communicated to all object applications 101 accessing that object schema 200.

One embodiment of the '197 patent facilitated the separation of data store access code 205 (such as Structured Query Language "SQL") from the object application 101 logic. This facilitated simple and rapid application development and lowered maintenance cost for a computer system that required database access by improving the flexibility of the object application 101 and by reducing the brittleness of the object application 101 client(s). As a result, users of the invention described in the '197 patent could attain a cost savings by centralizing the task, reducing the possibility of typographical errors, installation problems, and skills availability shortages. The object stores could be created and managed by someone with data store (i.e., relational) expertise (as most modern organizations have) without requiring those individuals to also have object programming expertise.

One embodiment of the '197 patent resulted in an architecture for centrally storing and managing object schema 200 to promote re-use, effect enhanced performance, and better use of (MIS) engineering and administrative personnel skills. By way of example, storing the access code 205 within the physical confines of the non-object data store 302 in one embodiment, created a centrally manageable and maintainable system for accessing that non-object store 302. The object schema manager 203 thus allowed for better use of the MIS personnel's skill sets by focusing on data access in terms familiar to people maintaining their respective system. That is, one embodiment of the '197 patent allowed object application engineers to concentrate on applications code without concern for or need to learn SQL or any other native access code 205 of the data store 302. At the same time, data store administrators could concentrate on managing and maintaining the data store(s) 302 without knowledge of application programming and without concern that any changes in the data store content 301 or data store schema 300 would adversely affect the object application(s) 101 in communication with the data store(s) 302 according to one embodiment of the '197 patent.

A central management architecture provided by one embodiment of the '197 patent allowed data store specialists to see, manage and control all access to the data store(s) 302 down to the individual access code 205 commands. It also allowed for the fine tuning and reconfiguration of those commands by the data store specialists, without involvement of object application developers. This architecture allowed the best skills to complete the respective task at hand without impacting or being impacted by a possible lack of skills that an individual for another area.

In one embodiment of the '197 patent, the object schema manager 203 allowed for the arbitrary creation and management of object schema(s) 200 via a point and click interface, thereby significantly increasing the efficiency of creating the data store access code 205, and improving the reliability of the overall system. This embodiment also allowed completely arbitrary joining and combining of the data store content 301 as a single object view of that data, and overcame the constrained and often uselessly arbitrary or non-existent foreign key constraints of conventional mapping systems and data stores. These hard-coded links such as foreign key constraints may not be supported properly by all underlying data stores, and not be implemented by the specific customer's data store (often legacy) implementation. New foreign key constraints are often not possible on some data stores because they may not work properly with older applications if the constraints were to be created and enforced.

As a point of reference, a foreign key is generally accepted as a predefined relationship or link which the data store manages in order to ensure that records are properly related in a database. A simple example would be to have a foreign key between an order number in an order table, and an order number in a line item table which keeps the individual items belonging to that order. The foreign key in this example would be between the order numbers in both tables, which might not allow, for example, a line item record to be entered if there is no order in the order table corresponding to the order number.

A join using this embodiment of the '197 patent may occur on any arbitrary field of any table within the data store schema 300, even if a foreign key does not exist between the fields of the two tables to be joined. Such flexibility is immeasurably useful when combined with the ability of the object schema manager 203 to access more than one data store 302 at the same time. The resulting architecture of the '197 patent allowed data store content 301 from one data store 302 to be joined with data store content 311 from another data store 312 through the object schema manager 203 without requiring any data store schema 300 changes to either system whose content is being joined. Such transparent and independent flexibility is of utmost value for the many diverse data stores currently operated by most large and small business and other entities.

One embodiment of the '197 patent provided a way to manage the data store access code 205, requiring only an understanding of the data store 302 and the data store schema 300, instead of requiring object programming knowledge within the modem working environment.

Once the object schema 200 was created, the object application 101 running in the application environment 103 sends a request 100 for an object 102 (possibly including an object data with lookup attributes to be matched) located in at least one data store such as an object data store 312 or a relational data store 302 in one embodiment of the subject invention. At a very high level, the request 100 was dynamically translated to a data store specific request which was then executed and results of which were parsed and new data object(s) 112 created and initialized with the results of the executed request 100.

In one embodiment of the '197 patent, the request 100 and the accompanying object '197 patent was passed from the object application 101 to the adapter abstraction layer 600 comprising the first adapter 400. The first adapter 400 then extracted the object attributes 103 and the object name 104 from the object 102, and packed the object attributes 103 and the object name 104 as data 105 to be used in communication and transport layers. The first adapter 400 then communicated the data 105 and the request 100 to the second adapter 500. The communication medium 630 between the first adapter 400 and the second adapter 500 may comprise an Internet connection, whereby the second adapter 500 is operating inside a firewall. Logical division 650 comprised a logical separation between a client, e.g., the object application 101, and a server, e.g., the abstraction layer 600 and more specifically the second adapter 500.

The second adapter 500 searched a meta data map 206 comprising at least one object name 114 using the object name 104 to determine whether the object name 104 existed in the meta data map 206. If the meta data map 206 contained the object name 104, then the second adapter 500 used the object attributes 103 and the found meta data map 201 to generate at least one command 303 for accessing the data store 302 according to the request 100, if the command has been enabled, ensuring further security by restricting access. An example of the '197 patent contemplated using this technology for "read only" data stores over the Internet, irrespective of the user's standard privileges within the context of the data store.

The second adapter 500 then executed at least one such command 303 as a data store access client server process 700 in communication with the data store 302 using a JDBC driver to which is passed data store access code 205 and obtains the data store content 301 and an execution status 306 based on executing at least one such command 303.

The second adapter 500 then processed the data store content 304 and the execution status 306 using meta data 201, and packed the obtained data store content 304 and the execution status 306 as data 115. The second adapter 500 communicated the data 115 to the first adapter 400.

The first adapter 400 unpacked the data 115 and instantiated the object attributes 113 and the object name 114 into potentially one or more new object(s) 112 and/or status according to the request 100 and the data 115. The first adapter 400 then communicated the request 100 and at least one such new object 112 and/or status, if object results were found, from the first adapter 400 to the application program 101.

Several points are noted regarding preferred embodiment implementation of the '197 patent invention in the preferred embodiment. As each object(s) 102 data was being read from the data store(s) 302 (312), an instance of the object's class type (or potentially some generic container object) was instantiated (in a preferred embodiment a Java Class is instantiated for each set row result returned) and initialized to the row of attributes returned in the result set. Because Java can instantiate new objects based on class name, objects could be managed by a preferred embodiment of '197 patent even though it may have been unaware of their existence or composition at compile time. For ease of implementation, each java class in order to be supported by the preferred embodiment must implement a standard interface. With compliance to this standard interface, the subject invention can call the methods necessary to initialize the data automatically, making new instances automatic and transparent to the client object application 101.

Implementation of explicit reference handling was not required using the subject invention, and therefore is not implemented in the preferred embodiment. Unlike more rigid systems which limit the type of operation and mechanisms which will and can be used to access data stores, the subject invention allows for flexibility. This is to reflect the market reality that most organizations operate large systems in place, which should be capable of being accessed from a variety of sources in a variety of different ways. Any attempts to manage references in these mixed environments would not only prove a futile exercise, but would complicate and reduce reliability, without providing the desired functionality. As for reference handling within the object application, the Java language, which was used to implement the preferred embodiment, has language supported reference counting within its memory management and garbage collection software. It is contemplated by the subject invention, however, that specific adapters and data objects may be implemented with this architecture for specific data stores supporting appropriate reference handling management.

A preferred embodiment of the '197 Patent used an in-memory list to maintain object references, which list could be either partially or fully pre-fetched. An object application may retrieve one object, all of the objects at once, or in blocks of default, or In blocks of a user defined size. Once the objects were in the memory list, they could be iterated through using their offset in the list as their index. The '197 patent also contemplated incorporating smart vectors for automatically fetching requested Objects from the vector instead of from the data store.

A preferred embodiment of the '197 patent provided non-granular simple transaction support, although the '197 patent invention contemplated either building it's own transaction management system, or using a pass through mechanism which allowed for more sophisticated transaction management to be written by the application programmer, if the underlying system supports it. Any limitations due to the preferred embodiment of the '197 patent being implemented in the Java Driver Database Layer and JDBC or the Java DataBase Connectivity Layer were not contemplated by the invention in the '197 patent. Thus, the '197 patent contemplated using more advanced transaction management, as available in the implementing language and architecture.

When the '197 patent invention was used to access the non-object data store 302, e.g., relational databases, the object schema 200 providing meta data 201 descriptions of how to map to the underlying data store 302 was used to generate the native access code 205 necessary to access the data store content 304. One embodiment of the '197 patent used the object schema 200 to build an SQL statement at runtime, which was then executed to get the desired results, based on the request 100. Because multiple statements are likely to be executed against a given class type after it has been first accessed, the '197 patent can cache the meta data for the class (name) in memory, within the second adapter 500 and saves pre-compiled versions of the access code 205 which can simply be re-executed without recompile. This approach provided improved performance characteristics for successive accesses. In the three-tier design embodiment of the subject invention, the cache was physically located on the server, and was therefore shared across all client accesses to that server, providing a performance optimization in an area where performance is most critical.

The '197 patent invention comprised the adapter abstraction layer 600 comprising a set of runtime adapters (e.g., the first adapter 400, the second adapter 500, the n-th adapter 4XX, 5XX), which can be transparently interchanged by the object application 101. The adapters serve various functions such as direct 2-tier data access, or 3-tier or even n-tier gateway/transport. Because all adapters implement the same API 700, they are interchangeable in the object application 101, providing new and useful functionality, beyond implementations described in the '197 patent, without requiring object application 101 modification. Object application 101 runtime flags can instantiate entirely new adapters interfacing with radically different data store(s) 302, without modifying object application 101.

When data store access code, e.g. SQL, is dynamic SQL instead of pre-compiled SQL, there are typically some performance penalties to be paid for dynamic execution. One preferred embodiment of the '197 patent addresses these performance issues by pre-compiling SQL the first time a given SQL operation was executed, and by preserving the compiled statement within the second adapter 500 for future executions from the same or a different first adapter 400. The '197 patent invention binds variables to the statement, and re-issues the generated access code with the new SQL. As a result, the penalty as to dynamic execution became a slight overhead the first time an object 102 of a given type was requested from the abstraction layer 600. Past this first point the performance characteristics should be the same as from any other embedded SQL client, perhaps even better because the amount of information to be processed and transferred to the server accessing the data store 302 was likely to be less using the architecture of the '197 patent than one which embeds SQL within a client object application and ships it with every request, and then must process the results inline, and often unnecessary descriptive data that is returned, and which is unnecessary in a system which is already preprogrammed with and understanding of the composition of the return values.

Because the first adapter 300 packed object request(s) 100 as a single API 700 call returning a single complex result (building the resulting data objects 112 transparently in the client from the returned complex data 115 packet), the '197 patent invention reduces network latency (which is essential to reduce over the Internet and other io-bound and high latency networks) and increases the performance and scalability of the involved clients and servers. The '197 patent invention also reduces the quantity of extraneous information which is always returned to client object applications by other prior art systems such as the JDBC type-3 distributed database access layer architecture upon which other common Java Database Products are currently built. As a result, not only did the '197 patent architecture obtain tremendous performance gains by reducing the latency of multiple network roundtrips, it also reduced the quantity of data and therefore increased the number of clients it could support, since each request/response required less I/O. Compression and data duplication reduction techniques were contemplated by in the '197 patent to further increase performance.

New adapters, e.g., 4XX, 5XX, could be added to the adapter abstraction layer 600 dynamically, even at runtime, as long as they complied with the API 700. This allowed data store(s) 302 (312) to have custom adapters built for them (such as object data stores or other relational and/or non-relational data sources) which comply with the API 700 of the subject invention and are loadable in the same way as the adapter abstraction layer 600 described in the '197 patent.

Figure 2:
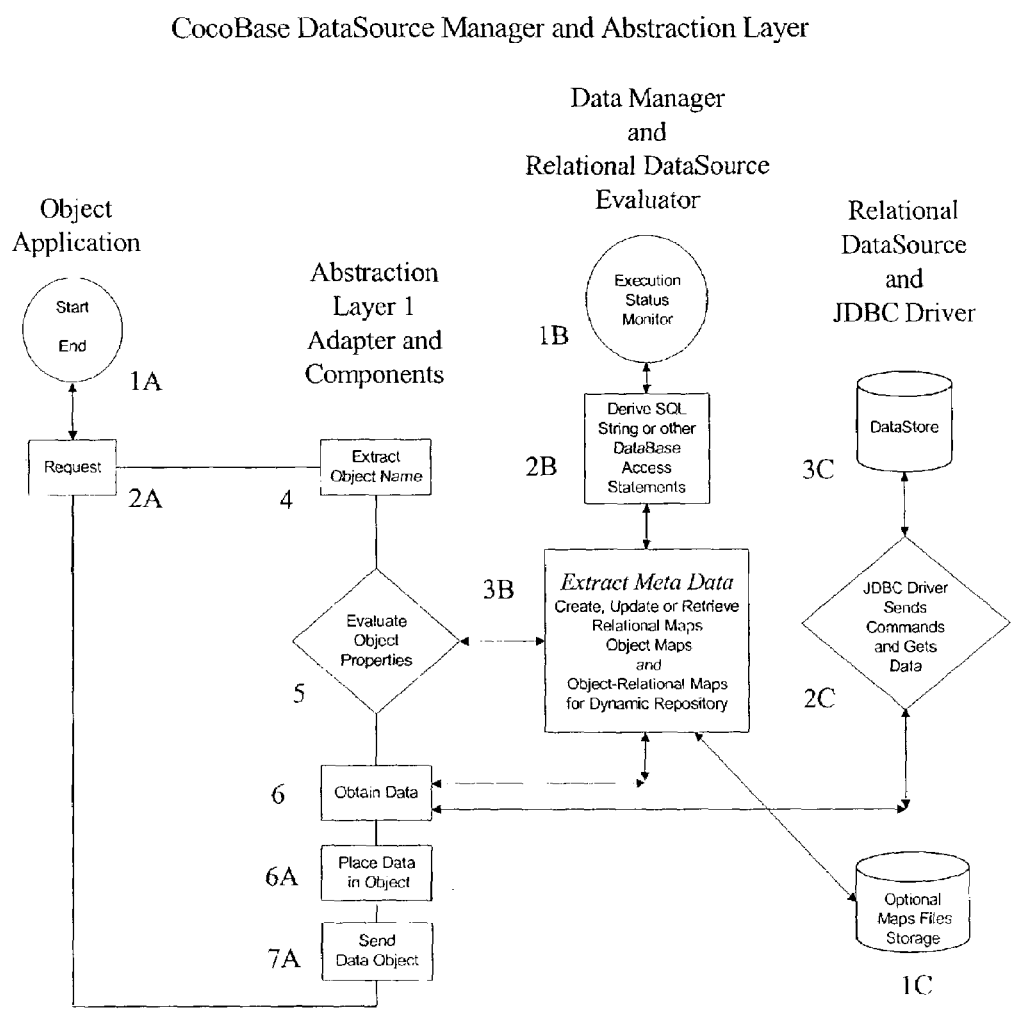
FIG. 2 is a concise flow chart depicting the operation of the system in U.S. Pat. No. 5,857,197 in a system comprising (a) an object language application program, (b) a data source manager and abstraction layer system embodiment of the U.S. Pat. No. 5,857,197 patented invention such as the CocoBase Enterprise O/R Software Tools Suite Version 4.0 (soon to be released) of Thought, Inc, San Francisco, Calif., and (c) a relational data source and JDBC driver. The operation of the system of FIG. 2 in the context of the flow chart operation will be described in detail below by referring to the FIG. 1 numbering system.
Figure 3:
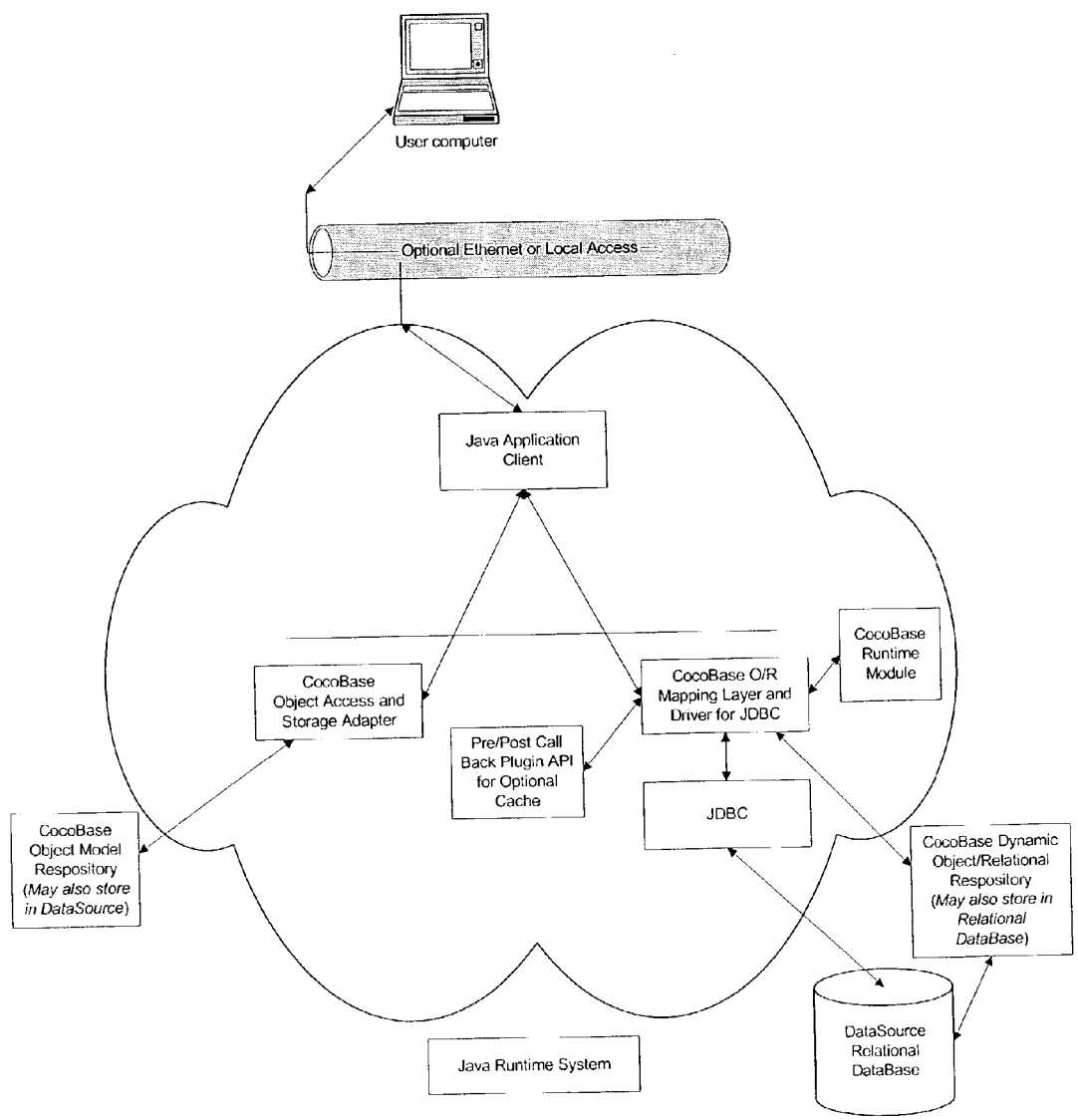
FIG. 3 is a diagram depicting the comprehensive operation of the present invention as described in FIG. 2, further including a number of system components or connection points for additional components. The wavy cloud that surrounds some of the system depicts the CocoBase components and the portion of the system that is called the Java environment. The additional component that are shown in FIG. 3 beyond the components described in FIG. 2 are (1) a CocoBase Object Access and Storage Adapter software module, (2) a CocoBase Object Model Repository (may be stored in a separate data source or in the system DataSource Relational Database), (3) a Plugin API (and optional caching database attached via the API) to the CocoBase Mapping Layer for caching one or more members of the group consisting of database data, query string(s), CocoBase Map(s), and data object(s), and (4) a CocoBase Dynamic Object/Relational Respository as a separate file, which could also be stored in the DataSource Relational DataBase.
Figure 4:
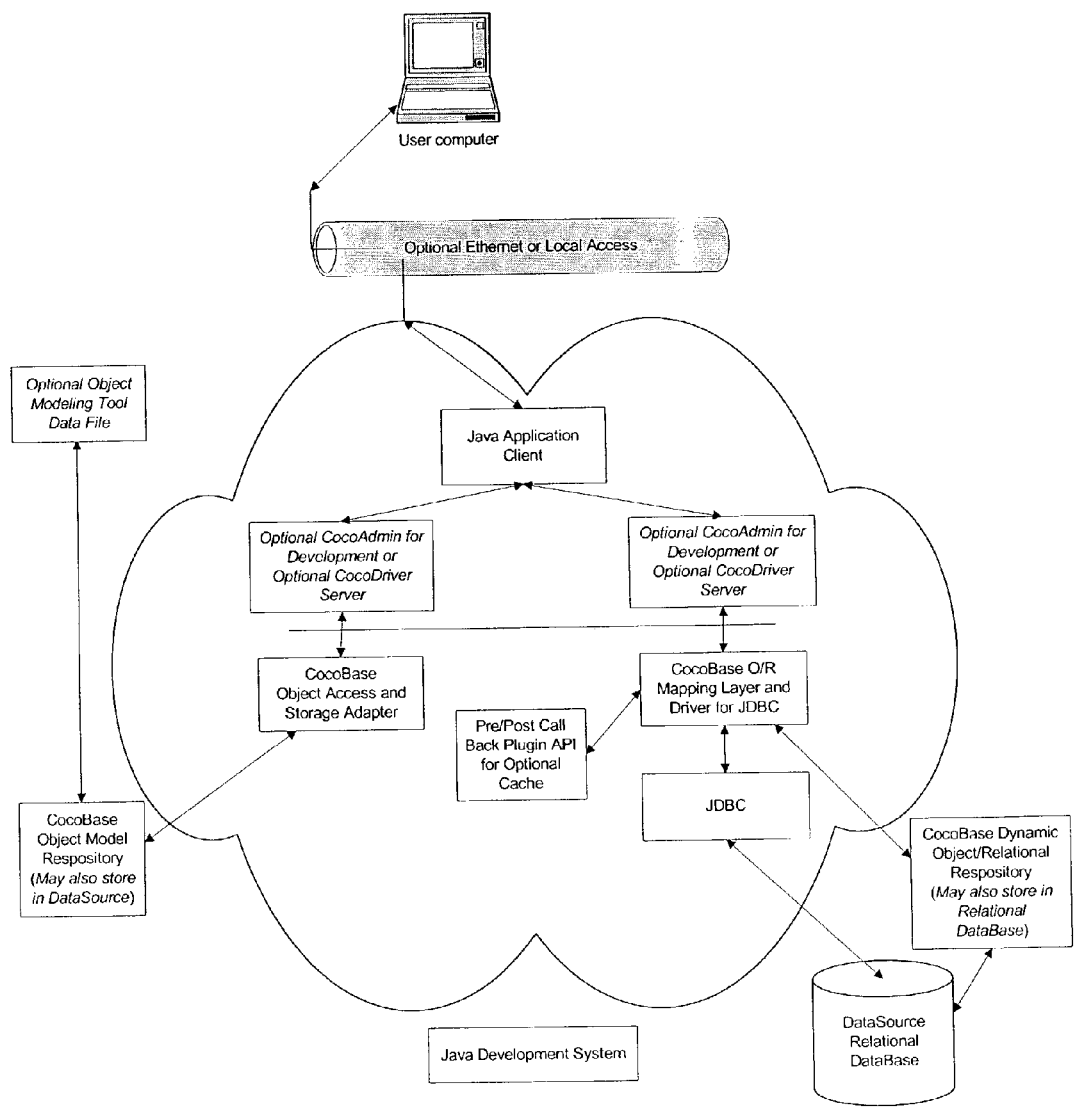
FIG. 4 is a diagram depicting the comprehensive operation of the present invention as described in FIG. 3, further including a number of system components or connection points for additional components. The additional components shown are (1) an CocoBase Development Software module called CocoAdmin having command line and/or GUI interfaces for accessing, editing and creating new maps, for generating source code, for compiling object classes from source code, or for generating J2EE components such as EBJs from CocoBase maps, (2) one or both of a CocoBase CocoDriver Server, (3) Object Access and Storage Adapter for processing the storage of objects or object schema(s), which may access or process them in the form of objects for an object database, as a UML file for a UML modeling tool, or may convert the objects or object scheme to or from one or more of UML, XML or XMI format representations of such objects or object schema(s), (3) an optional CocoBase Object Model Repository file, which may be stored as stand alone files, in an Object or Relational data source, or an XML repository, and (4) an optional Object Modeling Tool Data File which can be exchanged between the CocoBase Tool Suite and the Object Modeling Tool in one or more directions, i.e., to the CocoBase tool suite, from the CocoBase tool suite, or both to and from the CocoBase tool suite.
Figure 5:
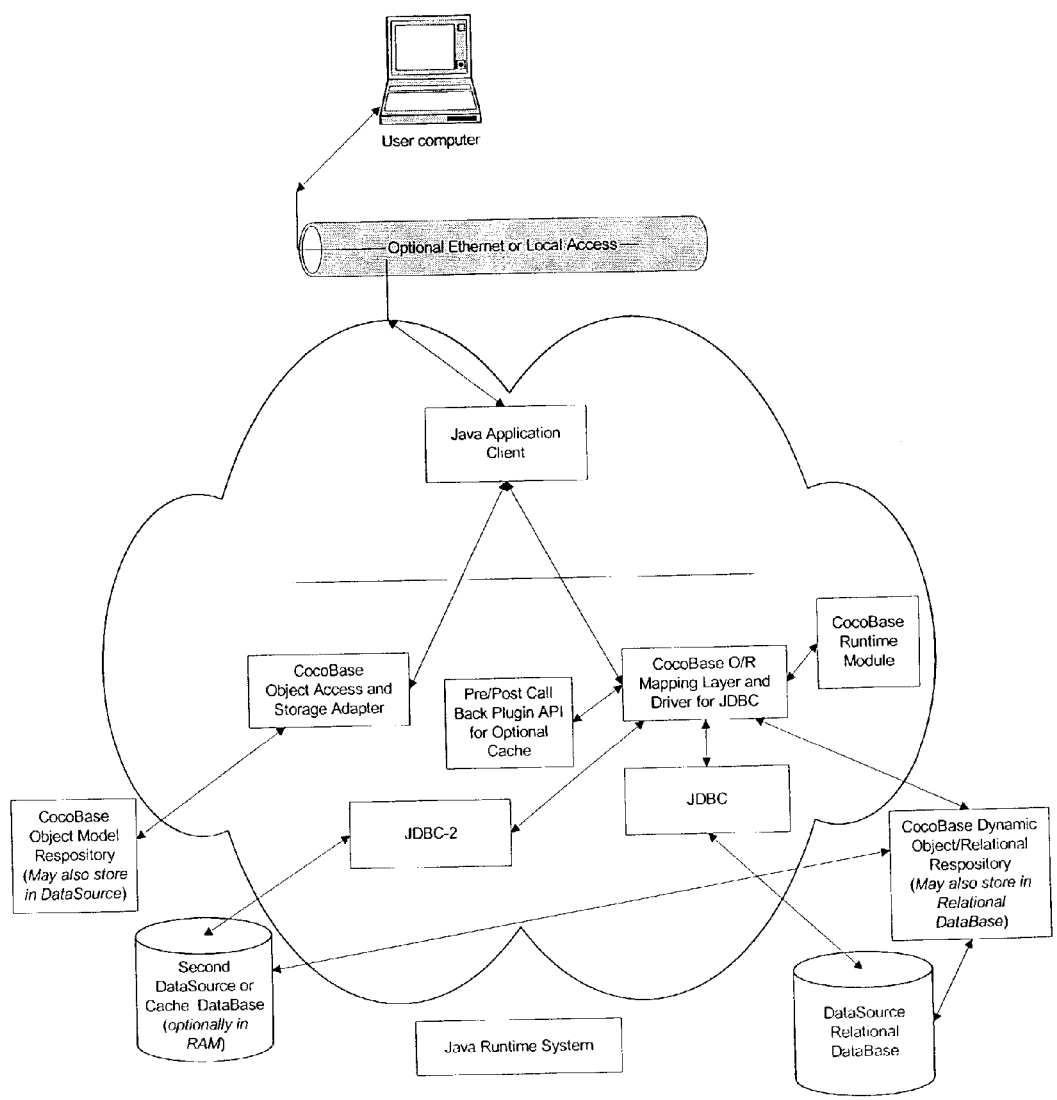
FIG. 5 is a diagram depicting the comprehensive operation of the present invention as described in FIG. 4, shown without the optional Object Modeling Tool Data File component, but further including a number of system components or connection points for additional components. The additional components are useful in a caching system or in a system for porting data from a first data source to a second data source. These additional components shown in FIG. 5 are (1) a second JDBC driver connection, and (2) a Second DataSource or Cache DataBase, where the Cache database may exist completely or in part in the system RAM, and may concurrently have a fixed storage medium component for the caching system.
Figure 6:
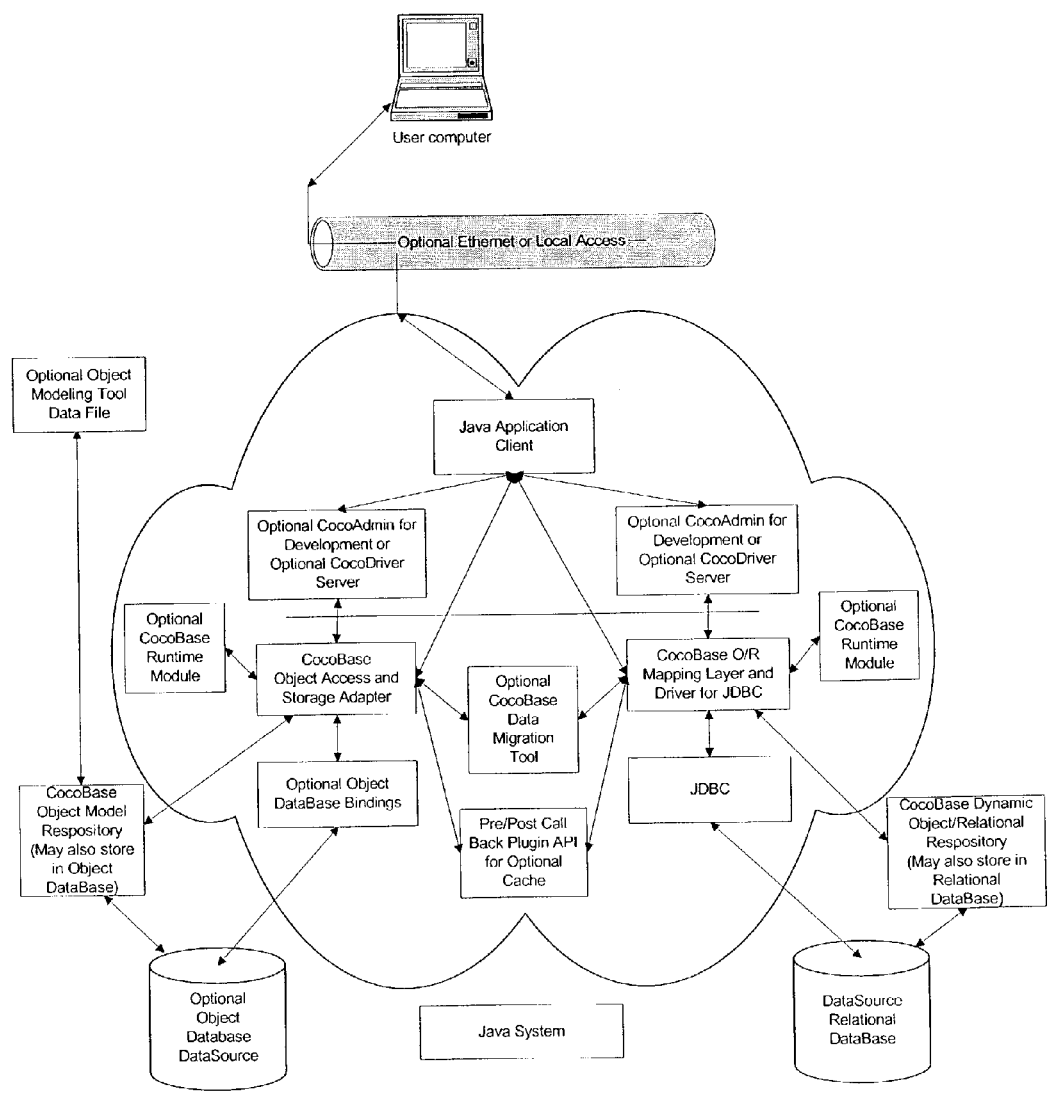
FIG. 6 is a diagram depicting the comprehensive operation of the present invention that combines all of the components described in FIGS. 2–5, or lists them as options within the diagram. This diagram shows a system having both a DataSource Relational DataBase and an Optional Object Database DataSource, as well as an Optional CocoBase Data Migration Tool. This migration tool can migrate and translate data between each of an Object database, a Relational database, an XML storage file, and a flat text file XMI file. An optional migration tool has the ability to migrate and translate to and from a UML format and an XMI format. Other system components have been described further in FIGS. 2–5. Also, how to implement or remove various components in a system as shown in FIG. 6 is further described below in the detailed description of the invention.

Detailed Description of FIG. 2

FIG. 2 is a concise flow chart depicting the operation of a computer system having an implementation of the "System and Method for Accessing Data Stores as Objects" described in U.S. Pat. No. 5,857,197. The system of FIG. 2 comprises three basic components (a) an object language application program, (b) a data source manager and abstraction layer system embodiment of the U.S. Pat. No. 5,857,197 patented invention (such as the soon to be released CocoBase Enterprise O/R Software Tools Suite Version 4.0 of Thought, Inc, San Francisco, Calif.), (c) a relational data source and corresponding JDBC driver, and (d) an optional Maps Files Storage facility. The operation of the system of FIG. 2 in the context of the flow chart operation will be described in detail below by referring to the FIG. 1 numbering system that was described above.

FIG. 2 starts at position 1A (Start/End) with a request step 2A from an object application (101 in FIG. 1), which calls the CocoBase DataSource Manager and Abstraction layer (hereafter CocoBase system) and delegates the database accessing to CocoBase. The logical loop that the CocoBase system performs begins in response to the request step (2A) and first performs the Extract Object Name step (4). The CocoBase system loop continues onward to the Evaluate Object Properties step (5) and its associated components where (i) object properties are evaluated (5), (ii) object to relational maps are accessed, created, or updated by 3B (and this may involve retrieving maps from the system DataStore 3C or from a separate Optional Maps Files Storage facility (1C)), and (iii) database commands necessary for data retrieval (including SQL strings) are generated at step 2B under the control of the Execution Status Monitor (1B), before the CocoBase system continues onward to the Obtain Data step (6). In step 6, the CocoBase system in coordination with components 1B, 2B and 3B, passes SQL strings or other DataBase Access Statements from 2B to the JDBC Driver (2C), which obtains data from the system DataStore (3C) and passes that data to the CocoBase system. Then the CocoBase system places the obtained data in an object (Step 6A, Place Data in Object and sends the Data Object (Step 7A, Send Data Object) to the Requestor Object Application (back to Step 2A position) and the delegation to the CocoBase system by the Object Application ends (back to Step 1A).

In the paragraph above, the general functions of the system of FIG. 2 have been explained. In the paragraphs below are more detailed descriptions for the (un-illustrated) CocoBase system components that may be involved in each step of the flow chart (or CocoBase components associated with that step as illustrated in FIG. 2) while using FIG. 1 reference numerals to better describe parts and functions of those CocoBase system components.

Please note that the description of FIG. 2 in the paragraph above and in the paragraphs below describe the CocoBase system as accessing a JDBC driver. This is a simplistic view of the system. Whenever an Application Server is utilized to run an object application and to coordinate with CocoBase and "XA" component often "wrappers" a JDBC driver and all database accesses are passed through the XA component. This more complex architecture is designed to monitor all data source activities in order to provide reliable transaction monitoring. Even with such a complex architecture the principles described above are valid and the application code still "delegates" all database accesses to the CocoBase system and does not directly access the JDBC driver for a given data source.

At step 1A, the Object Application (101) may contain two referenced parts (a) Object Schema (200) and (b) Meta Data (201), and its Request (100) for data at Step 2A, which is delegated to the CocoBase system.

At Steps 4 and 5, the Abstraction Layer Adapter 1 (400) may involve the Object Schema Manager (203), Object Schema (200), object data store contents (301) of DataStore (302) or in a separate external mapping repository storage facility (e.g., Optional Maps Files Storage (1C)) to obtain the Object Name (104) and Object Attributes (103) for objects (102) or (112) as data (105) to be used by the CocoBase system. Particularly at Step 5, the data (105) may be passed (optionally across a logical division 650) to a second Abstraction Layer adapter (500) to an abstraction layer portion 600. The second Abstraction Layer adapter (500) checks the meta data maps (201 or 206), which may be an Object/Relational map. The adapter (500) uses the object attributes (103) and the data map (201 or 206) to generate at least one command (303) such as an SQL string or other DataBase Access Statements (2B) under control of the Execution Status Monitor (1B) of adapter 500 for accessing a database, e.g., relational DataStore (302/3C).

The second adapter 500, at Step 6 of FIG. 2, then executes at least one command 303 as part of a data store access client server process 700 in communication with a JDBC driver (item 2C in FIG. 2) which converts the at least one command into a format that is understood by the data store 302 (item 3C in FIG. 2). In 2C of FIG. 2 the JDBC driver communicates with the data store item 3C by using data store access code 205 and obtains at least one item of data store content 301 and an execution status 306 based on executing at least one such command 303. The client server process 700 passes this data store content 301 and execution status 306 back to item 6 (Obtain Data) of the CocoBase system which coordinates with both the client server process 700 of CocoBase and the Execution Status Monitor component of FIG. 2 (item 1B) to provide this information to the second adaptor 500 of the CocoBase system.

The second adapter 500 then processes both the obtained data store content 304 (collection of at least one item of data store content 301) that corresponds to the request and the execution status 306 by using meta data 201 (of 3B in FIG. 2), and packs the obtained data store content 304 and the execution status 306 as data 115. The second adapter 500 of Step 6 in FIG. 2 communicates the data 115 to the first adapter 400 of Step 6A in FIG. 2.

In Step 6A of FIG. 2, the first adapter 400 unpacks the data 115 of Step 6, and instantiates a set of object attributes 113 and the object name 114 (object attributes and object name are obtained in Steps 4–6 of FIG. 2, see description above) into potentially one or more new object(s) 112 (see FIG. 2, Step 6A "Place Data in Object) and/or status according to the request 100 (the original request from Object Application 101 for data from Step 2A of FIG. 2) and the data 115.

In Step 7A of FIG. 2, the first adapter 400 of the CocoBase system then communicates the request 100 and at least one such new object 112 and/or status, if object results were found, from the first adapter 400 to the application program 101 request of Step 2A in FIG. 2. The Object Application 101 at 2A indicates receipt of the information to the CocoBase system and at Step 1A the Object Application completes and ends the data request process.

Detailed Description of FIGS. 3–6

FIGS. 3–6 illustrate more complex variations of the CocoBase system that is described in detail above with respect to FIG. 2. Different components and features are added to the basic system of FIG. 2 to provide features and functions that are described below in detail in the detailed description of the invention. See the description below for instructions on how to add or remove such additional CocoBase system components and their features to individual computer systems. Such details are provided below contextually for the individual components.

Figure 7:
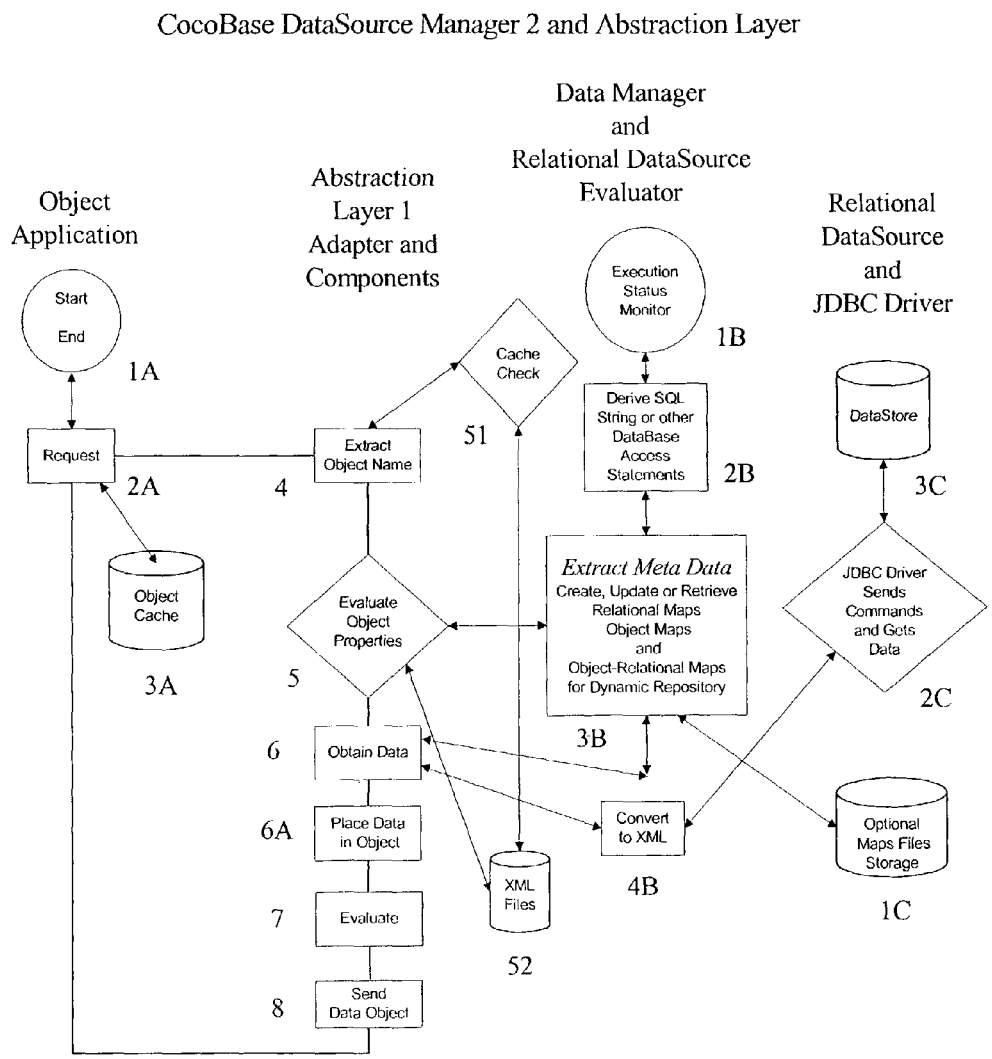
FIG. 7 is a concise flow chart diagram depicting the comprehensive operation of the present invention, and including a number of variations on the basic system described in FIG. 2. The components in FIG. 7 that have the same numbering as components in FIG. 2 will have the same description as those components as described for FIG. 2. In general, the invention of FIG. 7, includes (a) a new component or set of components and/or logical steps (3A) for caching objects, data or maps, (b) a new component or set of components and/or logical steps (7, 51, 52, and 8) for evaluating XML information and for extracting objects, data or maps from the XML information for placement in a object (information can be in XML format) and sending the object to the Object Application 101 in response to request (2A), (c) an new component or set of components and/or logical steps (4B) for converting objects, object schema, data, meta data, or maps into one or more of an XML file or into an XMI file.

Detailed Description of FIG. 7

As indicated above, FIG. 7 is a concise flow chart diagram depicting the comprehensive operation of the present invention, and including a number of variations on the basic system described in FIG. 2. The components in FIG. 7 that have the same numbering as components in FIG. 2 will have the same description as those components as described for FIG. 2. In general, the invention of FIG. 7, includes (a) a new component or set of components and/or logical steps (3A) for caching objects, data or maps, (b) a new component or set of components and/or logical steps (7, 51, 52, and 8) for evaluating XML information and for extracting objects, data or maps from the XML information for placement in a object (information can be in XML format) and sending the object to the Object Application 101 in response to request (2A), (c) an new component or set of components and/or logical steps (4B) for converting objects, object schema, data, meta data, or maps into one or more of an XML file or into an XMI file.

These additional components and features of FIG. 7 that are added beyond the basic system of FIG. 2 relate to providing features and functions that are described more fully below in the detailed description of the invention. See the description below for instructions on how to add or remove such additional CocoBase system components and their features to individual computer systems. Such details are provided below contextually as relates to the individual components of FIG. 7.

DEFINITIONS

For the purposes of the present application, the following definitions are given as a meaning for terms used herein throughout this application to avoid any confusion with possible multiple meanings for such terms. Other terms used herein have meanings that are well recognized in the art, and their meanings will be clear from the context in which they are used in this application.

A "module" in the computer programming context is an organized set of computer code designed to act on some externally passed in data, where everything needed for that action is passed in to the module.

An "object" in the object oriented programming context is an organized set of encapsulated programming code designed to act on itself at the request of some external system, which system may pass in some additional information to the object when it delegates a task to the object in that request.

A "composite object", or an object programming "component", in the object programming context each refer to an object comprising a complex and organized set of objects that are encapsulated to form the composite object. The two terms "composite object" and "component" (e.g., a J2EE component such as an EJB, Enterprise Java Bean) may be utilized in an interchangeable manner in referring to the same type of logical constructs and concepts.

A "delegation" in the object oriented programming context is where an object or a programming application permits another simple object, set of objects, composite object, or a module to perform an action by simply requesting the action from the delegated simple object, set of objects, composite object or a module.

A "non-delegation" database access in the object oriented programming context is where an object or a programming application has specific code imbedded in the application which directly controls database calls and the generation of SQL strings, wherein the imbedded code is specifically tailored for accessing a particular database or for a specific database schema.

A "user interface" for an object oriented application, such as a Java Server Page (JSP), a Swing GUI, and the like, refers to a software component or module that provides a feature for a user that will permit the user to interact with an object or programming application in some way, such as the interactions of finding, selecting, inserting, updating and deleting data in a database.

A "library" is a set of definitions, data, objects or programming modules that may be accessed by a computer programming application to obtain information or to delegate tasks.

A "repository" in the object programming context and in the context of this application is a special set of libraries that may include, among other things, items related to object to object mapping, object to relational mapping and database accessing information, database parameters, optimized database access routines, and the like. A repository may be a single file or may be a set of files. The format of items in a repository may vary widely according to the desire of a computer programmer user or developer and may be in one or more of formats such as simple text, XML, XMI, UML, JDBC, source code, compiled code, and the like.

DETAILED DESCRIPTION OF THE PREFERRED EMBODIMENTS

The present invention is based in part on U.S. Pat. No. 5,857,197, (incorporated herein by reference), and provides a mapping system for handling data requested by an object software application model in a manner that is compatible with relational data stores. A dynamic repository-based mapping system is used. The system does not put all of the data access code in java objects, for example metadata (data about java objects including complex java objects that have relationships with other java objects) does not need to be stored in a java object. Instead, the mapping information related to object definitions and some metadata can be placed in a separate structure that is independently stored. This allows the mapping information and associated metadata to be easily accessed, changed and used to convert thousands of lines of code in a data object, as needed. Mapping information can be used to map to and from objects to relational models, objects to objects, object to COBAL or vice versa, and object to XML and the like.

Certain of the embodiments of the present invention are embodied in a suite of products by Thought, Inc., referred to as "CocoBase". Aspects of the CocoBase technology are also described in U.S. Pat. No. 5,857,197, supra. Also, a number of details of the system of the present invention are provided now as state of the art in the documents that have been posted on the website of Thought, Inc. or are otherwise available on the internet as publications.

In one embodiment, the mapping information, rules, or metadata can be maintained in a human-readable format and can be interpreted by an application to apply the rules to data objects. This information can be stored directly in the data source or can be stored in a separate file. In either case, this information is called a "repository". This repository provides an easily maintainable and transportable format for the mapping rules. The rules and java object relationships can be updated, or otherwise changed, dynamically even while other rules or object relationships in the repository are being used to perform conversions. The rules and relationship definitions can be embedded in standard formats such as in Java code, e-mailed, sent as plain text, etc. This allows for flexible transfer and proliferation of the rules to other sites where the rules can be used to access objects (which can be bundled with the rules), used to derive other rules, etc. In a particularly preferred embodiment, this repository is in an XML (extensible markup language) format, and the object model definitions can also be present in an XMI (XML metadata interchange) format or can be easily exported to an XMI file format.

A more preferred embodiment is such a system and software as provided by an updated CocoBase Enterprise Object/Relation Software package (hereafter CocoBase), which includes the software tool CocoAdmine. Such updated software package, is available, or is available shortly, from Thought, Inc., San Francisco, Calif. An embodiment of the invention using this package is described below.

Exporting Maps as XML Repositories in CocoBase

CocoAdmin provides a mechanism for the export of maps defined against a database into a modifiable XML format. This facility allows a system user to select an existing map(s) to be exported, and to also specify the filename of the XML document to be created. The resulting XML document is written to a file with the specified filename using an XML template named coco.dtd that is ordinarily located in the thought\cocodemo3tier31\demos\resources directory.

Once the XML file is written, it can be edited using a standard text editor or XML editor, and can be modified to reflect map customization requirements. The following discussion relates to specific features of the generated XML file.

The basic repository format has CBobject (CocoBase object class) definitions that reflect the select, insert, update, delete and call related map definitions for a CocoBase map. Each of those operations further consists of tables, fields and clauses that may exist to specify how the object is mapped to and from the data source.

XML files contain a DTD (document type definition) entry which describes the structure of the tags and data contained in the file. The DTD only checks for the existence of required elements, but doesn't check the contents of those elements. Given this desired degree of freedom, it is possible to enter invalid map information which will not be processed properly by the CocoBase runtime and care should be exercised to avoid improper editing. In general, modifications should be restricted to the schema, table, and field name variables in the Tables and Fields entries. These variables may require different values when they are exported from one database instance, and imported into another.

To begin exporting a set of maps, select File->Export XML Map Repository from the CocoAdmin pull-down menu. Multiple maps can be selected by holding down either the <Shift> or <Control> when selecting the connection and map(s) to export.

When Next>is pressed in the dialog box provided, the list of selected maps will be presented in a list and the window will prompt for a final acknowledgement of export. The XML repository filename including the directory path can be specified in this window. If the directory path is not specified, the XML repository will be written to the thought\cocodemos3tier31\demosdirectory. When the Export XML>button in the dialog is pressed, CocoBase creates the XML file in the specified directory. After the document has been written to the disk a dialog appears which acknowledges that the repository has been created.

Importing Maps from XML Repositories Using CocoBase

CocoAdmin provides a mechanism for importing XML based CocoBase map definitions, or for importing an XMI object model definitions and then generating corresponding XML based CocoBase map definitions. Using the XML syntax defined in the thought\cocodemo3tier31\demos\resources\coco.dtd template file, CocoAdmin can import maps previously defined and exported from a different database or from a different object instance. The XML files generated from CocoAdmin will be validated against the DTD, and a basic syntax check will occur. No in depth syntax checking will occur because of the flexibility allowed in the system. When an import of an XML map definition occurs, it is in relation to an open database connection.

To begin importing an XML map definition from the CocoAdmin GUI select File->Import XML Map Repository from the pull-down menu or Import XML Map Repository from the popup menu in the main CocoAdmin dialog. Import an XML based map definition by selecting the database connection into which the import is to occur, and click the Browse button to find the XML repository file to be opened. After a file is selected the dialog button Load XML Document is clicked and the selected XML filename appears in the initial Import dialog. After the Next>button is pressed, the selected maps are compared with those already in the database. If a newer version of a map already exists in the database, by default a flag is set to retain the newer version. If the maps being imported are newer than the ones already in the database, then by default, a flag is set to import each of the newer ones. When the comparison operation is completed the user can override any flags before the task is initiated. For example, if the XML maps are older than the versions already in the database, this condition causes the Already Exists? flag to be checked and the XML map definitions will not be imported unless the user overrides this flag by checking the Import/Overwrite? box.

When a user clicks the Import XML Repository button as described above, maps marked for import will automatically be integrated into the list of maps in the CocoBase repository for that database. If the imported maps do not reflect the physical structure of the underlying database, they may need to be manually edited by the map editor before using them with an application. Also, XML format maps can be edited before they are imported. For example, an XML editor or any standard text editor can be used for this operation. Most common edits consist of changing column names, table names, and less frequently, the schema names of the tables and the fields that the map may access.

The CocoBase Programmer's Guide available at the www.thoughtinc.com website provides further information about how to work with XML format maps and CocoBase, which published document is incorporated herein by reference. This document also explains how to set CocoBase (or CocoAdmin of CocoBase) and its runtime modules to cache maps that an application will be using in order to speed up user access. Other user hints and instructions are provided therein. For example, one URL option in CocoBase is to specify an XML repository for the maps that an application will be using. Instead of using the database repository, the runtime can use an XML repository exclusively. This technique allows CocoBase to execute against a production database that cannot be modified with map definition tables. Optional mapping server plug-ins are also described.

Data source maps according to the present invention may be utilized to generate application programming code, such as Java source code. For example, the CocoAdmin tool will allow a user to generate Java for a range of targets including most commercial Application Servers and Enterprise Java Bean Servers. A complete list of pre-configured targets can be viewed from the Connections window in the Generate Java wizard of CocoAdmin. Any Java class can readily be used with CocoBase, whether or not it was generated by the CocoAdmin tool. However, there may be significant advantages that occur from using the code generation facilities of CocoBase to quickly generate your Java classes. For example, the disadvantages inherent with data source specific non-delegation database access code can be avoided by generating code, which delegates the database access functions to CocoBase runtime libraries. Only CocoBase is believed to utilize this type of code that results in dynamic O/R mapping system capabilities.

The CocoAdmin tool can use a combination of the map definition and database foreign key relationships (if any exist) to define how the Java class is going to be generated. The Generate Java wizard of CocoAdmin can be started in one of four ways to generate Java code from a CocoBase map.
1. Clicking the on the coffee pot icon located on the CocoAdmin tool bar.
2. Selecting File->Generate Java Code from the CocoAdmin pull down menu.
3. Selecting Generate Java from Existing Map from the launch pad after a connection has been made to a database repository, then clicking Launch.
4. Right clicking in the CocoAdmin main window and selecting Generate Java Code from Map from the pop-up menu.

From the connections directory tree in the Generate Java wizard, select the map from which a Java class will be generated. From this window, the CocoAdmin user can also set flags to automatically generate code that does one or more of the following:
Supports the transaction object (check TransObj).
Uses existing foreign keys to automatically determine object relationships (check ForeignKeys).
Uses the CBDrop, CBProp or both of CocoBase persistence interfaces (check CBProp and/or CBDrop).

The CocoAdmin user can also (optionally) enter in a package prefix at this point. Java classes are typically organized into packages, which are stored in a common directory. The package prefix (entered at the Pkg Prefix: prompt) will then refer to the directory in which the Java code will be stored.

The Code Generation Template drop-down list of the CocoAdmin code generation wizards allows a CocoAdmin user to select a target for the classes (Java code) that will be generated for a member of the comprehensive list of targets. The following target categories are supported for most commercially available application servers and EJB servers.

Java for distributed objects and application server applications.

Enterprise Java Beans with Bean Managed Persistence (BMP).

Enterprise Java Beans with Container Managed Persistence (CMP).

The Generic EJB Entity Bean CMP—All Parts option from the drop down of CocoAdmin will generate a completely standard CMP Bean, which can be installed using any vendor supplied CMP installer. CMP concepts for EJBs are discussed in a variety of documents published in this field, including in the appropriate section of the CocoBase Programmers Guide. In order to take full advantage of the CocoBase O/R mapping features, such as delegated database access and the like, a user must install the generic CMP with the CocoBase CMP installer tool, which is an optional component of the CocoBase software package. This tool will configure the CMP EJB to run in most commercially available EJB servers that support container managed persistence EJBs and coordinate the database access with the CocoBase runtime libraries.

Clicking Next>in the Generic EJB Entity Bean CMP—All Parts drop down wizards of CocoAdmin will present a user with a list of attributes which comprise the maps and any references (e.g. foreign keys) to other maps that may be navigated by CocoBase. For example, in a e-commerce shopping cart example, a Customer map, which is generated against a selected relational database connection, might be selected, and the PkgName: field might contain the name testpkg so the resulting Java code will be generated to a package and directory named testpkg. In a subsequent pop-up dialog, the user can add a foreign key reference by clicking on Insert Attribute and filling in the foreign key attribute in the inserted row. Such references can be added automatically for any operation which contains a join across tables of different maps. This topic is covered in more detail in the CocoBase Programmer's Guide.

Customizing Attributes to be Generated in Java Code by CocoAdmin

Attributes that are to be generated into the Java code by CocoAdmin can be customized through the code generation screen of CocoAdmin, which is displayed when a map is selected from the wizard connections tree and the Next>button is pressed.

For each fixed Map Attribute Label in the leftmost column of the table corresponding to a selected map, the corresponding Java Attribute Name and Field Type are editable. When the Field Type field item is placed in edit mode, the CocoAdmin user can select one of the available data types from the drop-down list. These relational data types will be mapped to a corresponding Java type when the code is generated. A relational to Java conversion table can be found in CocoBase Programmer's Guide, but any functional conversion table may be used. If foreign key references are present, each entry of the reference is also editable.

In general, the attributes for Java code to be generated should not be customized here unless a foreign key relationship needs to be modeled that isn't described by the database foreign keys or that isn't described correctly. Database foreign keys are automatically included in the map if the ForeignKeys checkbox in the wizard connections window is checked. Editing a map to include foreign key relationships is covered in the CocoBase Programmer's Guide.

A CocoAdmin user can specify a key for the map for the purposes of code generation by checking the box under the Key column. The attribute corresponding to the checked key box will be used as a key for the map and more than one box can be checked. For non-EJB applications, it is not necessary to specify a key, but keys can be useful in applications such as object caching and should contain unique values. Because EJBs require a unique key (for example, see the EJB spec. 1.0 from Sun Microsystems), CocoAdmin will not let a user generate code for an EJB without first specifying a key.

Customizing an Output Filename for Generated Java Code

When a map is generated into Java code by CocoAdmin, the output class name is specified manually by entering it in the File name field. If no filename is entered, the user will receive an error message when the user attempts to generate the Java code. Generally the user should adhere to Java naming conventions when naming package components. Package components should be saved in the PackageName directory and Java class files should have the form Classname or ClassName.java when entered into this field.

A CocoAdmin user can specify an existing output directory for the generated class (generated code) from the Look in: drop-down dialog. If from a previous window, the user specified a package prefix for the source code, then a subdirectory matching the prefix name can automatically be created in the specified output directory, if one does not already exist. Further information on naming and naming customization is presented in sections of the CocoBase Programmer's Guide.

Generating Java/EJB Code Using CocoBase

Once a filename has been entered as described above, a CocoAdmin user can generate the Java code by clicking the Generate button. When the Java Class or EJB has been generated, a dialog box indicating a successful generation will be displayed. If a user attempts to generate an EJB without specifying a key attribute, an code generation exception key must be specified! error message is received. Likewise an error message may be received if a file already exists with the filename that was specified by the user for code generation.

Prior to code generation maps of CocoBase may be customized to add relationships between fields, objects, and beans by creating links. Relationships between objects such as 1 to 1, 1 to many, and many to many may be set. Among other relationships, parent child class relationships are supported. Code may be generated which reflects such relationships. Also, during the code generation step relationships may be added using wizards and interfaces of CocoAdmin.

Link information can be dynamically entered and edited with a CocoAdmin dialog, or it can be loaded from the resources\coconavlink.properties file of CocoBase if code regeneration is going to occur often with the same class, and if keying in virtual foreign keys isn't practical. The database foreign keys are auto-detected at a table level, and can be edited using a CocoAdmin dialog if the Map name to be used is different from the default one generated using a table name.

See Appendix A and B for links and maps related to Inheritance and Cartesian models.

Customizing Generated Code through CocoBase Templates

The later versions of CocoBase Enterprise all have the ability to customize code generation through the use of multiple code generation templates. Templates are available from the tool through the cocoAdmin.properties configuration file. Each of the GENTEMPLATES name values found in a configuration file are comma delimited and specify the name of the code generation template to be used. The comma delimited file can be viewed using an ASCII text editor, for example. The "\" character which appears at the end of each line indicates a line continuation and is only relevant to the CocoAdmin tool. Name values present in this file can also describe a set of templates that will be processed simultaneously. The code generation list that appears in the tool by default includes, among other things, all of the major Java Application Server types, production of generic CMP, generate Java classes, generate JSP, and the like. See the current www.thoughtinc.com website for a more complete listing. The default Java object of the listing is a standard Java instance that implements the CocoBase interfaces. If a GemstoneJ EntityBean using Proxy objects is selected, for example, CocoAdmin will generate all of the GemstoneJ files necessary for a Bean Managed Persistent EJB Object. Such an "All Parts" template reference will actually cause several files to be generated. Such a selection would have a cocoAdmin.properties entry that specifies which template files are to be processed, and in what order to process them. Such a file might be found in the thought\cocodemos3tier31\demos\resources directory of a particular version of the installed CocoBase software package. In one embodiment of the invention, when a particular template is picked any file prefix/suffix values to be appended to the filename would also be prefixed or appended to the map name automatically.

Mapping from one Data Source Format to Another Data Source Format

In another embodiment the invention provides a system for mapping from a first database format to a second database format, or from one database to another database of the same type, as a way for transferring data or synchronizing data sources. The system includes: data in the first database format stored in the system; rules for translating from the first format to the second format stored as a separate structure from the data; and means for applying the rules to the data to obtain the second format. This system may include a means for transferring the data from a first data source to a second data source. In one embodiment this system includes a simple computer program in a computer language such as Java, which reads the data from the first database using a repository map that may optionally be cached in the computer memory of the system and then stores the accessed data to a second database using the same or a different repository map.

An example of the structure for such a system and a short description/outline for a computer program adapted to such a system that is capable of transferring data between a first data source and a second data source might be described as follows:

First, let us assume two databases: a first database (B1) and a second database (B2) wherein B1 and B2 have the different corresponding data map schemas (S1) and (S2), respectively, and wherein S1 and S2 have the two corresponding schema repositories (R1 and R2) that include maps defining the structure (schema) of the database, Java object information (Java object model and any relationships between Java objects of the Java object model, or defining both the database and Java object information.

M1 is a map (or maps) defining the database schema S1 of R1 including map (or maps) with definitions for relationships between Java objects corresponding to the data of B1, and M2 is a map (or maps) defining the database schema S2 of R2 including map (or maps) with definitions for relationships between Java objects corresponding to the data of B2.

The sample program outline,
(i) open a first system connection to access R1 and read M1
(ii) open a second system connection to access R2 and read M2
(iii) have a Java application create a Java object (Obj-1) in memory that can access the data of B1
(iv) allow the Java application to connect to B2 and access B2, or have the Java application create a Java object (Obj-2) in memory that can access the Obj-1 and also access B2,
(v) open B1 and B2
(vi) have Obj-1 retrieve data from B1 and place data in Obj-1
(vii) optionally have Obj-2 obtain data from Obj-1
(viii) have the Java application access B2 (optionally through Obj-2) and store the data of Obj-1 or Obj-2 in B2
(ix) clear Obj-1 and possibly Obj-2, or create a new instance of Obj-1 and possibly of Obj-2
(x) repeat steps (vi)–(viii) until all of the data is transferred from B1 to B2
(xi) close B1 and B2 and any other open files, and
(xii) end program.

In one preferred embodiment, step (vii) as described above involves having data retrieved by Obj-1 and then converted to an XML format data file which is then forwarded to a different location (and optionally simultaneously to a different user) on a distributed network, whereupon an existing or new instance of Obj-2 is populated with data from the forwarded XML format data file and Obj-2 then stores the data in B2. The XML format data file may be simply of a Java object, the data than can be stored in a Java object, or both the Java object and its data.

The above procedures implement a dynamic mapping layer in an exchange format such as XML that can directly exchange data from two data sources in a more dynamically controllable fashion to each other for the purposes of data import, export and exchange without the requirement of an intermediate third object. In such a model the developer would not be constrained by the structure of the database to which or from where the data is being transferred.

Also, the above example is an example of object to "DataSource" mapping. Data may be mapped to (or from) object and relational databases and may also be stored in XML. Also, XML stored maps can be utilized by CocoAdmin as a resource from which to generate object code for user applications. In one implementation, two system users (same or different system) using a single (or several major recognized) XML standard(s), can export or import (as XML files) either or both of the XML map definitions (relationships of data) and data (dataset) of the database. This would permit a user to distribute parts or all of a dataset (and/or maps) to a distributed network, or to multiple network users in useable XML format files. Such a phenomenon may be referred to generically as O/X mapping (object to XML) or R/X (relational to XML) in addition to O/R (object to relational mapping).

In one embodiment, O/X mapping step would permit importation or exportation of data (that was converted to XML) from XML to and from any business object. For example, data from any business implementation object could be exported as XML along with its relationships as defined by the mapping tool. This would implement a more flexible and dynamic mapping facility for taking XML datasets and using them to populate object instances other than the original ones that may have created the data. One good example of such an implementation would be to take a first XML document that is presented as a user screen interface to a dataset and utilize the information (dataset) populating the first XML document to seamless populate a second XML document (datasource to datasource via a XML (or another exchange format similar to XML) translation step.

There are many ways to utilize the above above implementations as part of either uni-directional or bi-directional mapping. Intranets and e-commerce applications can both take advantage of these important features. There are distinctive advantages when using a dynamic mapping layer where a java object provides translation by mapping such objects of a first data source (relational or object database) and also mapping such object to an XML or other second format data source. This allows more developer control as to how datasets are exchanged, filtered and/or validated between a first data source and a second data source.

One business use would be for a first party to use XML as a data export document to send information to a second party (e.g., items offered for sale) and the second party would import that information in order to generate a second XML data document (e.g., purchase order) that the first party can import. This would provide a much needed exchange format for the newly developing business to business market that might be able to rely on standardized XML data formats and avoid problems caused by object programming models that may vary widely from company to company.

Such a dynamic mapping facility would provide a critical missing facility to easily translate data models and object model into a format that can be readily used by business to business companies, or by the same company for department to department interactions.

Documents describing the use of CocoBase products that do mapping of data sources other than relational databases have been published, and such products may be used in conjunction with the above embodiments. Examples of mapping include, mapping from object to object databases and from COBAL (mainframe computers of businesses often use this language data source) to object. See the IBM "white paper" on the topic of COBAL to object mapping (may be downloaded from URL http://www.thoughtinc.com/websphere.html).

In one embodiment of the system of the present invention a translation layer translates between an object application (or a potential object application, i.e. an object model) to at least one relational database which includes data entries organized as tables and records. Examples are database architectures supported by companies such as Oracle, Sybase, Informix, etc. Such an organization is well-suited for manipulation by relational query languages such as SQL. However, the traditional relational database organization is not ideally suited for manipulation by an object-based system. Some tools, such as Java Database Connectivity (JDBC) exist to achieve some degree of indirect relational to object mapping by accommodating some differences between an object model or application and the structure of the relational database. However, these tools also have drawback in that they are often not scalable, require extensive manual recoding for different object applications and are complex to use. Even tools (often mistakenly referred to as object to relational, i.e., O/R tools) that generate JDBC code (instead of generating a pure SQL string that a JDBC driver can utilize to subsequently create a pure SQL statement or query bundled in a JDBC format) are limited since they are often application specific, database specific, or specific to both.

In one preferred embodiment, a translation or abstract layer communicates with at least one JDBC (relational database driver) and at least one primitive Extended Java Bean (EJB) construct. The function of such a translation layer (generally called the O/R layer in CocoBase documentation, for example) is to translate object-based queries for the data into queries that JDBC can, translate into queries for a relational database. In a preferred embodiment, the translation layer can generate an SQL string (or strings) based upon the object-based queries, which can be passed to at least one JDBC, which JDBC can then generate an SQL statement from the SQL string. Similarly, the abstract layer accepts results from the queries and provides them to one or more of the EJB constructs in a suitable object format. The existence of JDBC is not necessary for all implementations of the invention. Different types of databases, data models, computation architectures, and the like can be used within the basic principle of the present invention. This mapping can be one-to-one, many-to-one, many-to-many, or any variation.

Another preferred embodiment of the present invention allows for mapping tables to be plain text, or text-based XML repository files. This not only allows the maps to be human readable and editable with standard editions, email programs, web browsers, etc., but allows for easy transportability and delivery of the maps.

Another feature of the maps is that they can be dynamically loaded into a computer system to provide for new dynamic mapping in a system that can that can continue to run while the new maps are loaded and executed. As described supra, the use of the translation maps provides advantages in organization, standardization of interfaces, efficiency of design, compatibility, scalability, portability and other advantages. The system of the '197 patent provided an entire set of tools to simplify and improve an operators ability to manipulate the maps without requiring high levels of programming knowledge or database query language familiarity.

In part, the present invention is based upon a translation operation derived from the operation of U.S. Pat. No. 5,857,197, and depicted by the flow chart at FIG. 1. At step 1(a) the application software is operating, and reaches a point where data must be accessed to continue the operation. For purposes of example, the application software is object oriented, and is being run by a customer at a customer location. However, the application software need not always be limited to object orientation. Rather, other types of software models can be facilitated by the present invention to be described herein.

Once the application software reaches a point that data is needed, for example, a production database or data store, which is not at the site of the application or controlled by the application user, then a request 2(a) is made for that data.

As described in great detail in U.S. Pat. No. 5,857,197, when an object application makes a request for data such as 2(a), then certain object information is sent to a location whereby the necessary data can be accessed. Such activities may be coordinated or regulated by a transaction coordinator facility of an object application server.

The object information provided the object application is received in an abstract layer, also known as a translation layer, at step 4. At this point, an analysis takes place to extract certain information regarding the object sent by the object application. This information is used to select and manipulate a particular metadata maps provided by a data manager, which handles the data store containing any information required by the object application.

Operating entirely independent of the application software is the data manager. The data manager carries out an analysis of the arrangement of data in a data store controlled by the data manager at step 1(b). Depending upon the size of the data manager and the data store, any number of analysis can be carried out to help facilitate access by parties interested in the data held by the data store.

The result of this analysis is the development of a metadata map or maps based upon generated object characteristics of the arrangement of the data store. Depending upon the size and arrangement of the data store, any number of metadata maps can be generated. The number of generated object characteristics, which would be the basis of the metadata maps depends upon the data manager operator, and his/her response to the requirements and characteristics of those seeking access to the data store.

At step 3 a metadata map or metadata maps, based upon the object characteristics of the arrangement of the data store, are generated. The number and characteristics of these maps depend upon the characteristics of the arrangement of the data store, and the responsiveness of the data manager operator to the various types of demands for data by object applications. Each metadata map provides the necessary means to obtain data or particular types of data from the data store. It should be noted that in many cases there are many object characteristics can be derived from a relational data store. The data related to particular derived object characteristics that can be accessible using a metadata map generated for a selected group of object characteristics.

The operation of the object application and the management of the relational data store come together at step 5. At this point, an evaluation is made between the object information provided from the object application and object characteristics associated with the metadata map available in the data manager. The evaluation results in a selection of at least one metadata map appropriate for the object characteristics sent from the application. The selected metadata map is used to navigate through the data store to obtain data that is desired for the object application at step 6. It should be noted that more than one metadata map can be used to obtain data from the data store.

Once the data is obtained, it is sent back to the requesting object application at step 7. It should be noted that as described in U.S. Pat. No. 5,875,197, step 6 of obtaining data and step 7 of sending data are constituted by a much greater number of sub-steps. These include: generating demands from the metadata map; executing the commands used by the metadata map; obtaining data from the data store in response to the command; processing the data access from the data store using the metadata map; packing and manipulating the data for transmittal; unpacking the data; instantiating objects using the accessed data and returning the instantiated objects to the object application for further processing. It should be noted that the results of the overall data accessing process may contain many rows of data which can be used to instantiate a plurality of objects.

An important purpose of the aforementioned system is to achieve a high degree of flexibility with dynamic mapping to objects as they occur in object applications. Accordingly, it may become necessary to handle a plurality of objects at any one time, and obtain the necessary data to instantiate or otherwise satisfy requirements of each of the objects addressed in the object application. However, large amounts of data associated with each object may become cumbersome. Further, a single map for plural objects may also become awkward to handle.

Evaluation of object characteristics sent by object applications can often be time-consuming while not resulting in the selection of the best metadata map, and thus the most appropriate data may not be accessed. Further, depending upon the amount of data available in a data store and the number of metdata maps available, the selection process may become very slow and cumbersome.

However, there is a definite need for translating between a wide variety of different data formats, other than just the relational to object translation of the basic system of U.S. Pat. No. 5,857,197. There is also a need for transmitting quickly and easily between various types of databases. Further, there is also a need for editing or otherwise altering data exchanged between databases for the purpose of facilitating object applications. The basic system of U.S. Pat. No. 5,857,197 needs further support to facilitate expeditious operation, both for its basic system and for modifications to its system that will accommodate better security and for selectivity of data.

The enhanced operation and efficiency of the basic system by U.S. Pat. No. 5,857,197 is enhanced by the inventive modifications depicted in FIG. 7. The goal and purpose of the modified operation of FIG. 7 is to more quickly handle greater amounts of data by streamlining or otherwise enhancing the operation depicted in FIG. 1. The operation of FIG. 7 also facilitates greater flexibility in that the system more easily handles multiple maps for a single object as well as use of plural objects for a single map. The reconversion process of FIG. 7 also allows conversion between database formats of a wide variety. As a result, editing of data for a particular object application (or other type of application) is more easily facilitated. Further, changes in data for a particular object need be done only once if such changes are handled in accordance with the invention depicted in FIG. 7. A key attribute of the process of FIG. 7 is the enhanced processing speed facilitated thereby.

In the system of FIG. 7, steps 1(*a*) and 2(*a*) are carried out in the same manner as in the process of FIG. 1. It should be noted that the invention of FIG. 7 does not require that only objects be used to obtain data from relational databases. Rather, virtually any type of database can be accessed by virtually any type of application. However, for purposes of presenting a coherent example, translation relational database to objects required by an application will continue to be used. Also, as with the FIG. 1 embodiment, an abstract or translation layer is used to receive the request for data related to the objects provided by the object application. It should be noted that the abstract layer, which carries out much of translation activity can be constituted in a number of different ways. For example, the abstract layer can be the computers and communication links of a third entity (in addition to the application entity and data manager entity). One example would be the business entity Thought, Inc., the Assignee in the instant application. Thought, Inc. would provide all of the necessary software for the various translations and other operations that would provide the translation of relational data into object oriented form required by the object application in a manner that appears to be transparent.

However, the abstract layer need not be confined to a single business entity for a single group of computers. Rather, the functions of the abstract layer can be distributed over a number of different entities and associated computers, linked via the Internet, a number of different intranet arrangements, temporarily dedicated lines for fax or FTP transfers, satellite links, microwave links or any other communication link which will be used for exchanging data.

In another alternative, the abstract layer could be associated with the data manager, and be operated as a part thereof. However, depending upon the scope of data handled by the data manager, operations of the abstract layer could be limited thereby. In yet another alternative, the abstract layer would be part of the operating system of the entity operating the object-oriented application of software. However, the same limitations would apply thereto, as indicated for the situation with the abstract layer was part of the data manager. Clearly the most flexible arrangement is for a separate entity to handle the abstract layer, providing access to a wide variety of different customers operating these types of application software, and providing access to a wide variety of data stores and data store types. It should be noted that growth of such arrangements with many application user customers, accessing a wide variety of databases, leads to certain problems of scale. Many of these are addressed by the further system operation depicted in FIG. 7.

Rather than going through the process of extracting object data for conventional evaluation at step 5, this cumbersome and often slow operation can be bypassed by a cache check operation (step 51). While the cache check at step 51 can be carried out in the abstract layer as indicated in FIG. 7, the present invention is not limited thereby. Rather, the object data can be also be contained in a cache to be checked at step 3(*a*) at the application site. In this manner, the necessary object data can be transmitted directly to the abstract layer and used for the evaluation with the metadata (step 6) without going through the cumbersome extraction process.

It should be noted that the cache check operation 51 can be carried out by a plug-in software addition. In the alternative, the abstract layer may act as another database at a remote location. Apparently, the best method is to keep a cache memory located within the processing computers of the abstract layer to more quickly facilitate the cache check 51. This allows the manager of the abstract layer to control the object data that is cached for easy re-use.

In a preferred embodiment, the present invention to provides a fully synchronized caching system that utilizes the transaction coordination facilities of a server such as a J2EE application server (for example, Weblogic 6.1), such system comprising a local or distributed computer system having a first data source referred to as the primary data source, a second data source referred to as the cache data source and the cache data source is associated with an object to relational mapping layer to provide a data source cache for object applications, and a server having a transaction coordinator with the ability to register multiple data sources, wherein:

(a) both the primary data source and the cache data source are registered with the transaction coordinator facilities of the server, and (b) the cache data source acts as secondary data source to speed up data accesses for an object application and the cache data is plugged into the object to relational mapping layer, and (c) registration of the cache data source with the transaction monitor of the server provides the feature that any changes to the cache will automatically be sycronized with the primary data source or record upon transaction completion, including commit or roll-back of changes for both data sources.

A number of primary object databases exist in the art. Non-limiting examples are: (a) Gemstone by Gemstone, Inc., Beaverton, Oreg., (b) Itasca by IBEX Corporation, Minneapolis, Minn., (c) Jasmine by Computer Associates International, Inc., Islandia, N.Y., (d) Matisse by ADB, Inc., Redwood Shores, Calif., (e) NeoAccess by NeoLogical Systems, Berkely, Calif., (f) $O_2$ by Ardent Software, Versailles, France (g) Objectivity/DB, Objectivity, Inc., Mountain View, Calif., (h) ObjectStore and Javelin, both by Object Design, Inc., Burlington, Mass., (i) ONTOS DB by ONTOS, Inc., Lowell, Mass., (j) POET by POET Software Corp., San Mateo, Calif., (k) UniSQL by Cincom Systems, Cincinnatti, Ohio, and (l) Versant by Versant Object Technology Corp, Menlo Park, Calif.

A number of primary relational databases exist in the art and have been described earlier in text that was presented above.

A number of SQL searchable memory resident relational databases that utilize JDBC drivers exist in the art, which may be adapted for use as a secondary database buffer in the context of the present invention. Non-limiting examples are: (a) HypersonicSQL, an open source relational database (publicly available for free at http://sourceforge.net including source code) that is simultaneously disk and memory resident, (b) TimesTen by TimesTen Performance Software, Mountain View, Calif., and (c) Polyhedra by Polyhedra, plc, Bellview, Wash.

A particularly preferred embodiment of the invention provides a cache data source can be set up as a memory-resident entire database, a disk resident database, or both a memory resident database and disk resident which are synchronized. In one object, of the invention the memory resident database may be a portion of the disk resident database and the size of the memory for the memory resident database can be set by the user.

One embodiment of the present invention provides a dynamic distributed or local caching system for an object model or one or more datasources by utilizing a call back API and at least one listener object that utilizes the call back API to listen for when changes to an object are to be pushed to a datasource or persisted. In a preferred embodiment the main listener object will broadcast such changes to any other registered listener(s) such as a navigation object, session bean persistence objects, or other such listeners. In a distributed caching system, a main session bean for persistence can be a listener for changes to any objects or object models that are registered to be persisted and may broadcast such changes to other session beans or object model navigator object instances.

In such an embodiment of dynamic distributed or local caching, when a listener detects via the call-back API that a change to an object or object model is pushed to a database, the object or model is marked by the listener as being dirty or invalidated, and the system can be set (parameters, flags, or property files) to provide different ways to handle this change in the cache. For example, an object or object model can be re-read from the datasource to obtain the changed object or object model and update the cache. In some situations, the listener can be set through the call back API to obtain data from the changed object and the broadcast notification of the change to registered listeners can contain the new object or object model values which can be used to update the local copy of the object or object model instead of obtaining the updated object or object model information directly from a data source. Also, a system can be set to notify the user that an object or object model cannot be changed because they have has been updated by someone else in the system, and to notify the user to simply obtain an updated copy of the object or object model or to mark their copy of the object as being old and not useable by the system.

Below is a general example explaining how a plug-in can be used as a database synchronization mechanism across multiple databases or multiple users such as across a first database and a second database. This example does not show (but the user can envision in view of the above description) where a listener class is checking for any push of changed objects or object models to a data source such as the caching data source or the main data source. The example below involves two data sources, but could easily have been two users of a cache, object, object model or data source. Two different instances by the same user are logically two users.

Example and Explanation for Using the CocoBase Plug-in Architecture to Synchronize Heterogeneous DataBases Suppose the existence of 2 databases, B1 and B2, with different schemas, S1 and S2.

Assume both B1 and B2 have their own CocoBase repositories R1 and R2, where M1 is a map defined in R1 and M2 is a map defined in R2 and both M1 and M2 are optionally identified by the same map name.

Suppose that the system uses CocoBase (commercially available object to relational mapping tool having a mapping repository capability) and a connection of CocoBase with B1 is established as follows:

```
CocoDriverInterface connB1 =
CocoDriver.getCocoDriver (cbdriver, jdbcdriver, jdbcUrl +
";cocoplugin=thought.CocoBase.SynchPlugin", user, passwd);
"thought.CocoBase.SynchPlugin" is the name of the plug-in class
that is configured to replicate operations of database B1 to
database B2. For example, for the "insert" operation, the plugin
implementation would be similar to the following
(suppose replicationDB is set to connection to database B2):
    public int insert (int code, CocoUser userObj, Object
keyObject, String objectName, Integer objCount) {
        switch (code) {
        case CocoServerPlugin.CB_PRE:
            break;
        case CocoServerPlugin.CB_POST:
            Object o = null;
                if (objCount.intValue ( ) >= 1) { // if object
was insert in B1
                    this.replicationDB.insert (keyObject,
objectName); // we insert it in B2
                }
            break;
        default:
            throw new RuntimeException("Invalid plugin!");
        }
        return CocoServerPlugin.CB_CONTINUE;
}
```

Once the above connections of CocoBase are established, any accesses to the database B1, such as:

```
connB1.insert (. . .)
``` will have the plug-in access B2 and replicate the operation that was conducted on database B1.

The same mechanism described above can be used to replicate the result of other database operations (e.g. update, select, delete, etc.) that are performed against B1. Further, the application that uses CocoBase maps to access B1 and B2 can have CocoBase set B1 as the primary database and B2 as the cache database. In such a situation only the cache database B2 needs to be accessed to retrieve data when data that the application needs is present in B2, but both data sources need to be accessed in order to insert or store data. This can significantly speed up data retrieve by avoiding disk accesses for data already present in a memory cache.

In the case where B1 and B2 are both registered as data sources in an XML descriptor file with a J2EE application server (for example, Weblogic 6.1) in combination with the CocoBase plug-in cache facility, a fully synchronized caching system can be provided that utilizes the transaction coordination facilities of the server. Very important and significant database caching abilities along with transparent data persistence is provided while providing transaction coordination that is controlled by the J2EE application server.

To more specifically describing the cache check 51, in virtually any situation involving the cache check 51 of CocoBase, separate transactions will be carried out for cache check operation. In such a transaction a check of the cache will be made. If found, the relevant object data will then be moved to the next step of the operation for evaluation with the metadata (step 7). If, on the other hand, the relevant object data is not found, the evaluation process takes place. This is controlled by the abstract layer manager for purposes of the present example, and includes an evaluation of the object data to determine what should be placed permanently in the cache memory that is used by the abstract layer for containing object layer data. Such an evaluation can be carried out for adding object data to a cache, whether or not the cache is controlled by the manager of the abstract layer. For example, it is entirely possible for data manager to carry out such a caching operation more easily supplying those metadata maps that are requested most often.

In the parallel activity occurring at the data manager, steps 1(*b*), 2(*b*) and 3(*b*) are carried out in the same manner as the operation of the system in FIG. 1. The difference is that at step 4(*b*) selected metadata maps are converted to the XML format. This is a format already known for its facility in the handling text, thereby making modifications to the text of the map relatively easy. Selected metadata map or maps are loaded at step 6 into the abstract layer. The evaluation process at step 7 takes place to determine how to construct the actual commands to access the necessary data from the data store in order to satisfy the request from the object application (step 8) in XML format.

The use of XML format facilitates modification of the map with simple text editors. Once the map is altered (to determine how data is to be stored and arranged), the application user can then use the map to effect the desired data handling for any associated objects. As a result, the data is easily manipulated without extensive recoating or programming expertise for the data store architecture, as is required with conventional systems.

Another alternative that speeds the overall operation of the translation process is to convert selected cached objects into XML format at step 52. In effect, the system is carrying out objects to XML mapping to facilitate faster operation to the overall system, as well as easier modification of the object and map.

Based upon the presumption of a future single (or several major) XML standards, it would be practical to export not only XML map definition but also the production data accessed by the map definitions. Once formed, the data can be easily distributed to an entire network. Thus, step 8 of the FIG. 7 embodiments could be further modified so that the data is sent in XML format rather than just the map. XML is a highly desirable data exchange format since the data can be e-mailed to XML format more easily. The speed of translation and evaluation discussed for the FIG. 7 invention enhances the dynamic operation of the overall system in that maps can be loaded very quickly, responsive to requests based upon object data. Further, the map can also be altered dynamically (during the run time of the application) to suit the requester managing the application software. Further, the object to XML mapping would permit importation of data from XML format to any business object. Likewise, data from any business implementation object could be converted and exported in XML format along with its relationship, as defined by mapping tool such as metadata map.

Greater flexibility and faster dynamic mapping can also be achieved by taking XML data sets and using them to substantiate selected objects. An example of this would be to take a first XML document and utilize the information (data) within the first XML document to seamlessly substantiate objects in a second XML document. While this can be done by altering step 4(*b*) in FIG. 7 to convert data store to XML in response to a provision of selected objects.

Accordingly, there will be a substantial advantage in generating XML data documents for exchange between parties to carry out commercial transactions. Conversion to XML will also facilitate the use of data sources or data architecture other than relational databases. Examples of such mapping includes object-to-object mapping and JAVA to object mapping. Once algorithms translating between XML and object formats are standardized, translations between any type of system can take place seamlessly and very quickly. Mapping can also include the use of JAVA Server Page (JSP) format.

Once editing has took place either for the metadata maps or even the production data from the datastore, changes can be recorded in the operation of Asnapshots@ so that a record of the map or other data at various times can be studied. As a result, data management paradigms can be developed. Normally such Asnapshots@ are made at the location of the party requesting the data (such as the object application user) once map modification is completed. The modified filed can then be placed in a source code management system.

The snapshots or map modifications, or even general data of modification is facilitated through the use of caching. Since a variety of different types of data (including metadata maps, objects, production data, and the like) are used as options in the inventive system, a number of caching methods must be adopted in order to accommodate the various types of data. Examples of caches include: a write-through cache without transactional integration; a two phase commit integrated cache; and, a temporary working storage cache, which acts as a second database. All three of these techniques are discussed in more detail below. The present invention is also used to distribute caching or database using a plug-in Java database. Any number of different caching arrangements can be applied to the system of the present invention, but are limited only by what is possible in the art of data storage. The various caching arrangements can also be used to facilitate global changes in maps and data.

If caching arrangements are to be used with CocoBase, the accessing and updating of information must be defined in some clear way to control the caching and avoid unclear or unacceptable results. Discussed below are three methods for our caching controlling, followed by two examples of ways we cache in memory as either a "database" in memory with a third party plug-in or a "caching in memory of data" where both are connected to the O/R run-time layer. When a user connects to the O/R layer and subsequent database they register any optional plug-ins for caching or extending behavior and this then controls the access to data per one of the three mechanisms. Such options can be very powerful when combined with transaction capabilities of some Java application servers.

Write-through Cache without Transactional Integration

The first type of cache design is a "write-through cache without transactional integration" (no two-phase commit). This model assumes that applications not going through CocoBase may also be updating data in the first database (data source). In this method if a store data attempt fails at the first database, then the corresponding data of the second database (cached data) is deleted and may be (or may not be) refreshed from the first database depending upon developer policy. If the store data succeeds at the first database, then the corresponding data is updated in the second database (cached data). Notification of storage attempt results can be sent to the user to indicate a successful or failed attempt to store data. Therefore, multiple users can be utilizing the same cache in this instance and multiple applicationw (e.g, applications that do not go through CocoBase) may be accessing the first database and data integrity can be maintained.

Two-Phase Commit Cache

The second type of cache design is a two-phase commit cache design. This type of caching only allows updates of data by applications that work through CocoBase, through an application(s) that is either a compatibly integrated application(s) working concurrently with CocoBase, or uses the same policies of updating as CocoBase. In this cache model, data is only updated if CocoBase, or the integrated application can update the data in both the first database (source) and the second database (cached data). A commit to change data in both the first and second database (or information cache) is obtained as a first step and store data (update) completion is done in a second step. Again multiple users can use the same database source (or multiple application if they are integrated properly with CocoBase) and data integrity can be maintained.

Temporary Working Cache

The third type of cache design is a temporary working cache design. This type of caching only allows updates of data by applications that work through this temporary working storage cache (i.e., memory buffer or a second database which may be completely or partially memory resident database). This temporary working storage cache is designed to shield a first database from access and act as the datasource to users. The updating and accessing of the first database can be defined by rules of the developer as they desire. This cache design assumes that database accesses by database information users are directed to the cached information through CocoBase or through another application. The information in this working storage cache is used to intermittently update or to not update the first database (data source) as defined by the developer. In such a model, transactional coordinated database updates and persistence should be synchronized by registering both databases with the application having transaction coordination, such as the J2EE server Weblogic 6.1, for example. In such a case, this cache design may be described as a synchronized transactional database caching model.

The CocoBase software suite provides distributed caching of a database by using a plug-in third party free java database (for example HYPERSONIC SQL), however any third party java accessible database could be used. For example, a CocoBase application user can define a map of a first relational or object database to be accessed, and then import the data into a memory cache through a plug-in java accessible database (second database). This can allows CocoBase or compatible integrated applications to control access to data as defined by a developer, and database users may be re-directed to access the second database in memory instead of accessing the first database in order to speed up performance. This also permits a database to be distributed to multiple users or to multiple applications on a network, where CocoBase or pre-defined developer rules control the updating and persisting of data by storing back to the original database any changes made to the memory cached java accessible database according to one of the three caching methods described above.

A distributed cache may use optional mapping server plug-ins and control access to multiple server databases. In plain English, the data source object database such as Oracle is opened as a first server database, and a second server database (for example HYPERSONIC SEQUEL) is also opened as a third party memory or virtual memory resident object database. The second server database can be loaded into a designated mapping server memory area. Once the first database is accessed, the data is sent to the second server database for storage and also sent to the user. Future accesses to that same data are directed by CocoBase to the second database. Also, updates of data are directed to both the first and second database by CocoBase and/or by a transactional coordinator of a J2EE server such as Weblogic 6.1 where both databases are registered with the J2EE server.

Alternatively, some of the latest alternatives for caching use the caching capability of a server to which CocoBase is providing maps and connectivity with a database, or the caching capability of another accessible caching facility. Any stand alone caching facility that a developer connects with the O/R layer as describe above in the caching methods descriptions can be implemented as a cache for database accesses).

A caching facility may be utilized by CocoBase to create a single or multiple objects in accessible caching facility memory, which object (or objects) may be stored in a relational database (or really any other piece of data, data object or data stream) object database, etc. for possible re-use or multiple use by application(s). CocoBase, integrated applications, or pre-defined developer rules will then control access to data and can permit the developer to require a user to directly access the data in cached memory rather than accessing the original data source. This can really speed up performance, e.g., up to 40 times faster with the combination of Oracle as the first database and Hypersonic as the second (cache) database than by using ordinary Oracle database accessing.

For optimizing performance of applications that utilize the CocoBase runtime libraries and other repositories, it is important to cache not only data, but also to cache the map (or maps) to be used in the CocoBase mapping runtime. The underlying mapping connection automatically does this in CocoBase. So for example if a user is accessing an instance of 'Customer', the underlying thought.COCOBASE.COCOPOWDER software module will cache the map information for the customer map within the connection object.

In terms of CocoBase, map caching is when the software suite reads and caches the map created with a mapping administration tool such as COCOADMIN into RAM (random access memory) of the computer system. Once this map is cached, the CocoBase runtime repository libraries can generate and execute SQL much faster, but the first step of reading a map into RAM can be relatively expensive resource-wise. The cached maps are kept internally by CocoBase in a pre-compiled form that is exceedingly efficient for the runtime to access. Maps by default are cached within a connection once they are loaded and used for the first time. It is also possible to cache maps for all connections within a Java Virtual Machine (JVM) by using the CocoBase URL extensions for controlling cross connection caching.

There are two mechanisms that can be used currently with the CocoBase enterprise runtime libraries to control map caching.

The first is to use a cache configuration file that specifies which maps to pre-fetch and to place in shared cache. This type of map caching is controlled through a syntax such as:

```
JDBCURL: cocorep=configresource:/resourcefile.propertieS
``` or for example

```
JDBCURL:cocorep=configfile:/opt/file.properties
```

The cocorep syntax can begin with a colon ':' or semi-colon ';' syntax, so it can be compatible with different computer systems. The resource syntax describes what config resource should be loaded from the CLASSPATH, either directly from the file system or from some archived file such as a JAR or Zip file. The syntax of the config file is that a list of MAPNAMES needs to be specified in a comma delimited form for the tag MAPNAME. A sample resourcefile.properties file might appear as follows:

```
# Map names to preload
MAPNAMES = Customer,com.mypkg.Address,com.altpkg.Order
```

Another type of CocoBase software suite map caching that can be done is based on an XML repository. A set of maps can be exported as an XML repository and either placed into an archived deployment file, such as a JAR or zip file, or the XML repository can be an un-archived file that is loaded directly from the file system. To specify an XML repository in the CocoBase URL, the syntax would look something like:

```
JDBCURL;cocorep=resource:/CocoRepository.xml
or
JDBCURL; cocorep=file:/mydirectory/CocoRepository.xml
```

Both the colon and semi-colon are supported as the separator character for CocoBase URL extensions. As a result ';cocorep . . . ' and ':cocorep . . . ' would be processed the same by the CocoBase runtime libraries. Some EJB descriptor syntax requirements place special meaning on the colon or semi-colon, so CocoBase makes it possible to use either of these two syntax choices.

Fortunately, map caching with CocoBase only needs to occur once a session or once a JVM depending on the option used, and then it is cached in RAM. This initial read and caching process should be taken into account if any performance tests are being created to test CocoBase. Using the per JVM map caching can be a great way to pre-load and pre-fetch maps so that performance numbers are accurate based on normal execution patterns.

The mapping server of CocoBase can be extended through custom developed classes called plug-ins. A CocoBase plug-in implements the Java interface thought.coco-BASE.cocoserverPlugin. This is a standard Java interface, and any Java class, which implements it and provides a public default constructor can be loaded automatically by the server at startup. Examples of such plug-ins are the cache and connection pool that ship as source code in the demos directory of the CocoBase software tools suite.

A CocoBase mapping server plug-in will implement the following interface signature:

```
public interface CocoServerPlugin {
    public int call (int code, CocoUser userObj, int objCount, Object keyObject, String objectName, Vector returnObjs);
    public int close (int code, CocoUser userObj);
    public int commit (int code, CocoUser userObj);
    public int connect (int code, CocoUser userObj);
    public int delete (int code, CocoUser userObj, Object keyObject, String objectName, Integer objCount);
    public int getColumns (int code, CocoUser userObj, String catalogName, Vector colInfo);
    public int getValue (int code, CocoUser userObj, Object key, Object value);
    public int insert (int code, CocoUser userObj, Object keyObject, String objectName, Integer objCount);
    public int rollback (int code, CocoUser userObj);
    public int select (int code, CocoUser userObj, int selectType, int selectCount, Object keyObject, String objectName, Vector returnObjs);
    public void setCommObject (Object comObject);
    public int setValue (int code, CocoUser userObj, Object key, Object value);
    public int update (int code, CocoUser userObj, Object keyObject, Object newObject, String objectName,Integer objCount);
}
```

In such an implementation, each method will be called before and after the associated operation (such as select) and the code will specify whether the action is a pre or post process operation also defined as public static codes in the plug-in interface API class.

```
public static int CB_PRE=0;
public static int CB_POST=1;
```

The Post condition will always be called unless the plug-in aborts or finishes the operation in the pre-condition of the plug-in. Otherwise the plug-in will finish its pre processing, continue into the actual mapping connection, and then call the plug-in again with the post processing flag. After the completion of the post-processing, the resulting Objects or return codes will be passed back to the client process.

If the plug-in wishes to intercept and 'finish' an operation in the pre-process state without actually having the Mapping layer become involved, then the CB_FINISH return code can be returned as the return code of the method. If there is an error in the pre-processing and it is desirable to abort the request once again without involving the actual mapping layer, then we can return a CB_ABORT code. Otherwise the CB_CONTINUE should be returned (an all is well code).

```
public static int CB_CONTINUE=0;
public static int CB_ABORT=1;
public static int CB_FINISH=2;
```

Since all select operations come through the single 'select' callback, a software application may need to know which method the client called. CocoBase uses a code to distinguish what the client actually requested the call with the following values. This tells CocoBase if a select, selectBlock, selectNext or selectAll was called by the client, and the software can respond accordingly.

```
public static int CB_SELECTONE=0;
public static int CB_SELECTBLOCK=1;
public static int CB_SELECTNEXT=2;
public static int CB_SELECTALL=3;
```

Since a callback may be shared information, CocoBase needs a way to determine the 'context' of which user and which connection the callback is dealing with. In each of the methods, an instance of the thought.cocobase.cocouser is passed into the plug-in. This is the context object, which contains all of the information of the user, its underlying mapping connection and any other private data that the plug-in wishes to store in the object. Each of the cocouser instances has the following public 'get' interfaces (note that each has a corresponding set operation available):

```
public class CocoUser {
    public String getCocoConnection( );
    public String getCocoDriver( );
    public String getCocoURL( ) {
    public Object getDBConnection( ) {
    public String getPassword( ) {
    public String getUser( ) {
    public Object getUserInfo( ) {
}
```

The getUserInfo( ) method (and corresponding setUserInfo( ) method) is used by CocoBase to retrieve a plug-specific object. This can be any object (include lists of other objects) that will prove useful in the plug-in. This provides a very simple and flexible system that is fully extensible, and still easy to program.

There are several examples of plug-ins included with the published CocoBase evaluation distribution, and analyzing the working programming source code included as part of the distribution is often the best teaching mechanism. The caching mechanism makes extensive use of many of the features described above.

Client Programming Applications can Access Multiple Server Databases at Once

The mapping server provides a convenient platform to access and map and enterprise set of data sources, not just a single database. This provides a convenient system for porting data from one data source to another data source (see above).

Below are several examples of how a 3-tier client using CocoBase can access multiple databases from a single client object programming application:
1) The client can open up multiple connections to the same (or different) CocoBase Server—each having it's own database parameters and logins.
2) The server connection can access multiple physical databases through a software product called a 'Gateway'. These systems create a virtual relational database over top of a user's physical databases. Vendors such as Computer Associates, Oracle and B2Systems all have Gateway products that can be accessed from JDBC drivers, and such JDBC drivers can easily be connected to CocoBase.
3) If both sources being accessed are Oracle, Oracle DBLinks can be used to link in tables from other instances into the current instance being accessed.
4) Multiple physical connections can be accessed by using a plug-in which is easily obtained by extending one of the sample plug-ins shipped with the CocoBase evaluation distribution along the lines described above and in the instructions of the distribution, and loading the extended plug-in into the Mapping server.

A simple example for extending one of the shipped plug-in would be to have two open connections, one connection to a first database and a one connection to a second reference database. When the client wishes to first try to obtain data from the second database (for example, the second database is a faster or smaller memory resident database), a shared connection to the second database is left open in the plug-in, which would append a list of objects available from that database to the getcolumns lookup. The connection to the second database would integrate into the selected plug-in to provide a pre-process state so that data requested from the first database by the client program will cause the CocoBase runtime libraries to first look in the second reference database for an object that is present in the reference list of available objects before attempting to access the first database that also has an open connection.

There are other ways for modifying the plug-in to accomplish the same result. For example, a plug-in could be modified to use the cocouser storage area to store additional connections or lists of connections to be accessed first in response to efforts by an application client to look up objects.

Object Caching for Performance Enhancement

Object caching is provided by reading an Object (usually representing an underlying database row or fetched result set) instance and placing the data in memory for future reference while causing the database connection of CocoBase to remembers that the data is now in memory for future reference and it is unnecessary to access the database for that data. Using this technique, if the same Object instance is requested more than once by a programming application, it can be simply pulled from memory, instead of having to be retrieved from the physical database and the related overhead associated from that operation. Since subsequent reads are read from the in-memory copy instead of the underlying data storage system, this technique can be VERY efficient and highly enhance performance. If the database server is over burdened, this can become essential for optimizing and increasing overall system performance. Since the Object Cache allows users to retrieve data quickly and efficiently from memory, it can often avoid the need for object look-up again, even with multiple clients.

With CocoBase Object Caching, as the data for each object (or the object in the case of accessing an object database) is loaded from the data source, the loaded object is stored in an in memory object cache. The Object must be uniquely identifiable to be cached—in other words a 'unique' primary key field or composite key fields must be defined. This cache is shared by all of the clients accessing the Mapping Server, and, as a result, only one copy needs to be in memory at once.

The CocoBase Object Cache contains a method for looking up the object in terms of its unique object identifier column(s). Before an object is loaded from the database by the CocoBase runtime repository, it is looked up in the cache by the identifier column(s). Using this technique, an object present in the cache is loaded from the cache instead of requiring the system to access the data source and create a new instance of the object. If the object is found in the cache, then that object is returned from the cache. A developer could create the cache in a way that would cause it to grow and fill all available memory, so it is wise to use a large memory size for the Java startup parameters. If a VERY large set of tables needs to be cached, then something like the Gemstone/J Java virtual machine should be used. Their virtual machine can grow with its own virtual memory, allowing the cache to grow as needed.

Caching with the CocoBase Enterprise Optional Mapping Server

CocoBase Enterprise provides two separate examples of a shared central cache source code examples of optional mapping server plug-ins. These programs are cocoserversamplecache.java and cocoserversamplecachepool.java, and each is included as both source and pre-compile binary forms. The plug-ins can be modified for custom caching, or they can used as they are shipped to provide useful out-of-the-box shared caching. The shipped compiled binary code classes belong to the thought.cocobase package by default, and should be copied into the subdirectory . . . \classes\ thought\cocobase if the developer finds it necessary to modify the source code and then re-compile the modified code to provide new pre-compiled binary forms.

In the demos directory of the CocoBase package there is provided a cache configuration file, which can be used to configure Map keys that will be used by the system for caching features. The file cocokeybundle.properties found in the demos directory of the installed CocoBase software package, can be edited to customize caching easily. Just add entries for each map which describe the key or keys of that map, which will comprise a unique 'key' utilized in identifying each unique instance. The format is 'Map=COL[, COL2[,.] . . ]'. To provide an index for the Map 'customer' using both attributes 'name' and 'address' as the composite unique key, place an entry in the cocokeybundle.properties file which has the following format:

customer=NAME,ADDRESS

Note in the above entry that the attributes are ALWAYS upper case, and that they match the 'virtual' column name used in the map (for example :NAME and :ADDRESS even if columns are NAM and ADDR).

The client (presuming they have permission through proper assignment of their admin ids by system administrators) can "additional override" this default value, but using a cocokeybundle.properties file will allow the caching to be configured on the server without having to code or make client specific changes. By using this default properties file, each column that is included in the properties file is made part of the lookup key by the cache.

In some cases, it may be desirable to allow the client to configure a cache, and the following example code accomplishes the same task. This example code is extracted from the demo program cocodemocache.java included in the demos directory of the installed CocoBase software package. The example code uses the CBSETCACHEKEY "virtual Object" and "procedure call", both of which can be intercepted in the caching plug-in, and the plug-in can be set to over-ride each of them to manage caching configuration.

```
//
// Set up a searchable cache key for the Customer Map.
// Since the demo database doesn't have primary keys supported
// in JDBC, we can simulate a primary key by configuring.
//
Vector cbkeyfields = myBase.getColumns("CBSETCACHEKEY");
    if(cbkeyfields != null) {
        System.out.println("Server is cache Configurable,
configuring Customer object cache.");
        // Configure Key information for Customer so server caches
it
        // properly. We only have to do this because
        // SimpleText doesn't support primary Key fields. If it
        // did, this wouldn't be
        // necessary.
        GenPObject gpo = new GenPObject( );
        Properties props = new Properties( );
        // We want to index on the NAME attribute
        props.put("KEYLIST", "NAME,ADDRESS");
        props.put("OBJNAME","Customer");
        props.put("CBADMINUSER", "cbadmin");
        props.put("CBADMINPASS", "cbadmin");
        gpo.setPropObjectData(props);
        myBase.call(gpo, "CBSETCACHEKEY", 0);
    }
    else
        System.out.println("Server either doesn't support Caching
or isn't cache configurable.");
```

While it is much simpler to configure caching on the server through the properties file (and preferable) as described above, client side configuration is also possible using the technique described above. Both plug-ins keep the cached objects in a local in memory server cache until the changes have been committed into the database. Once the changes to objects are committed into the database, the cached objects are merged into the central shared cache and are then accessible by other clients needing those objects.

Performance can be enhanced by maintaining a list of previously instantiated objects in an "in memory" cache list of objects in the Optional Mapping Server. This can be readily accomplished through using a variety of data structures and facilities including Hashtables, vectors and object databases such as Gemstone (which use a technique called "persistence by reachability") to extend the Java Virtual machine to have Virtual Memory.

System Performance Increases are Possible with Caching and CocoBase

CocoBase can support several thousand direct database requests per minute even on a simple Pentium server with garden-variety databases. Caching provides an even better scaling promise, especially for heavily accessed databases. Services such as Caching and connection pool management can significantly enhance performance numbers. Tests of the caching methods when CocoBase was being improved to implement the above concepts have shown that performance ca nearly triple through the use of even simple caching techniques. For example, some internal benchmarks with CocoBase and caching have clocked a 233 MHz K6/Pentium processor machine with Windows NT and 64 MB RAM as being able to serve up about 20,000 database requests per minute for individually requested cached data objects. The 20,000 requests did not constitute high volumes of data (about 30 bytes per request—a simple Object), but nonetheless such benchmarks can give developers a "rule of thumb" idea of potential increases in throughput due to caching, even when a very low-end and non-tuned system is used to serve up responses to database requests.

Other tests with CocoBase and caching used a small matrix test suite to show approximately how many cached read operations per minute a developer might be able to expect on a sample Platform. The numbers also indicated how accessing blocks of data can actually increase the overall network throughput of objects that a server is capable of handling. For example, blocking data in access blocks of 100 instead of access blocks of one can actually increase the server throughput to 5 times the data volume even when though the number of actual requests, which could be served, was reduced. These tests might encourage developers to use the block API wherever possible, and then tuning the access block sizes to an appropriate size for an individual application to enhance performance.

In some caching tests, a block size of 20 had a higher throughput overall than a block size of 100, a fact that may be related to the mechanics of how CORBA handles large blocks of I/O.

The above performance numbers might be merely considered guidelines, since performance numbers such as this can be very network, ORB and data specific. However, these test do clearly demonstrate that using CocoBase with caching (Mapping Server Cache) in combination with the tuning of block size can have an significant impact on performance, and can sometimes provide a significant throughput increase for application/database servers.

There are obviously additional ways to tune specific environments and configurations even outside of CocoBase, since the above numbers are mainly given as approximations that demonstrate the CocoBase system and technology that can give developers real world examples of tuning performance, and perhaps a ballpark idea of what might be possible. Performance enhancement of an individual system and application configuration may vary based on Java Runtime, OS, Database(s) used, networking configuration including and bandwidth capacity, ORB, etc.

Where caching really can really be beneficial to a system is in the client's 'perceived' performance, and when 'blocks' of data can be successfully cached (i.e., the application does not need to wait for an SQL statement to execute in order to access and use data for processing a request, and the system does not have to wait for the same unchanged records to be accumulated in memory over and over again), a system can seem faster because of the reduced processing delays. The CocoBase system uses caches that are written to serve multiple users out of a single pool, and by default the CocoBase cache system is a write-through cache for extremely scalable performance numbers.

Such a write through cache is written for a CocoBase system designed to provide scalable performance while avoiding certain undesirable impacts on the transactional capabilities of individual application servers. Since caching is a complex science, it should not be tackled at the beginning of a project that uses the CocoBase system. Instead caching should be implemented and fine-tuned as a final step in development. Such techniques can allow a developer to refine and improve an already streamlined system and avoids using a cache during development that could lead to unfortunate masking of poor software designs and system design flaws. Such problems might only become evident when the final application is implemented and scaled, if performance issues arise, which were masked by the caching during development stages.

Enabling Optional Mapping Server Object Caching

In the Optional Mapping Server that can be used for object caching, caching is implemented in the Server Plug-ins instead of being within the Optional Mapping Server itself. This can provide more flexible caching that is user extensible. If either the cocoserversamplecache or cocoserversamplecachePool plug-in is loaded, all objects having a database primary key that is accessible from a JDBC will be cached by the CocoBase system. In this system, object data caching is done through the Optional Mapping Server plug-in APIs. Source code jump-starts for providing caching are included with the Optional Mapping Server as source code, but the CocoBase system does not automatically integrate caching directly into the Optional Mapping Server. Such integrations should be saved until the later stages of project development to avoid masking design flaws.

At the final stages of development, a developer can utilize the source code provided with the CocoBase package and implement a specific kind of caching necessary for the design of the developed system, and integrate that caching system into the Mapping Server. As described above, when the source code of the examples provided don't provide explicit functionality desired by a developer, the code is extensible and can be modified to meet specific project requirements.

Sample cache provided can yield many of the common features needed by developers when the CocoBase system is implemented, and the sample cache will probably be completely useful without modification for many tasks. Modification and implementation of caches are an advanced developer functionality issue. The steps of implementing and tuning caching should only be taken on as a final step before deployment, and be taken on with careful planning. Blindly implementing caching without fully understanding a system design and understanding the purposes for caching in the context of that system design can create serious performance, memory and data integrity issues. For example, having multiple databases open in combination with caching can raise real issues with respect to data integrity if caching and multiple databases are not managed properly, particularly where database accesses are not properly managed and synchronized.

Managing Object Integrity for Applications Using a CocoBase System

Object integrity is typically maintained by keeping the cache synchronized with the data in the underlying data store, and by ensuring that any changes are reflected in the cache if, and ONLY if, such changes are successfully committed to the database. When a programming application ends a transaction with a commit operation, any updated persistent objects are written back to the data store, locks are released, and the client specific cache is invalidated (this is referred to as integrating the client specific cache into the shared cache). When the application ends a transaction with a rollback operation, updates are discarded, locks are released, and the client specific cache is invalidated. This will leave the shared cache unaffected and unmodified.

For some application environments, objects may additionally need to be retained in the cache across transaction boundaries (in other words it may be desirable to integrate a change into the shared cache before it is committed). In this case, some application-specific logic is needed to deal with the need for consistency between the objects and the underlying data store.

Another important issue associated with Object Integrity is the need for unique Object Instances. If duplicates are allowed, it can become nearly impossible for a system to cache and to track Object Instances without the use of the transactional capabilities of a server to synchronize the cache and the main datasource. Because of this, some 'composite' key may be required to ensure that unique instances exist. If a unique key definition exists, then the Mapping Server can manage Object Integrity more properly.

Differences Between Map Caching and Data Object Caching

Object Caching and Map Caching should not be confused. Object Caching caches the user data, and must be implemented in a Optional Mapping Server plug-in. Map Caching automatically occurs in a CocoBase connection. Since Maps can become quite complex depending on the number of where conditions and fields involved in its definition, it becomes critical to Cache connections by default. As a default, CocoBase meta data for each Map is cached by the CocoBase system the first time that the Object is accessed.

The meta data caching can be triggered for a particular map before the data from the map is utilized by calling the method getcolumns( ) on the Connection with the Map name as the parameter such as:

```
Vector tempVect = myBase.getColumns ("Customer");
```

In this example, a customer Map will be accessed and cached in the CocoBase runtime before any SQL is created or allowed to execute. This is a convenient method designed to speed runtime access of Maps in the Mapping Server through pre-loading and caching the Map. If this pre-loading and caching is necessary for Maps that are likely to be accessed by clients, it can be done at server/connection startup in order to improve perceived user performance characteristics. Once the server/connection is achieved the system is ready for database accesses, there is nos second delay required to pre-load and to cache the maps before accessing data.

Because some systems may have literally thousands of Maps for a single connection, the CocoBase runtime is not configured by default to auto-load all maps, only those specifically requested to be loaded or accessed directly will be automatically loaded. In the case of Map caching, a lazy cache is more effective. Especially since with a lazy cache it is so easy to trigger a load and cache of particular Maps that are likely to be used.

CocoBase is currently configured to only permit an application to dump a Map cache from a connection by closing and re-open a connection. Such a dump involves only two method calls, and is easy to implement if necessary by simply entering calls similar to the calls to the "MYBASE" database that following two lines illustrate:

```
MyBase.close( );
MyBase.connect( );
```

These two lines will cause all of the Meta Data Map information related to this database to be reset from the connection.

Object Uniqueness Requirements in a Cache

Since it is possible with most databases to have duplicate records in a table that maps the data structure, this can prove problematic for providing a caching function that can server up unique Object Instances. The CocoBase system and runtime resolves this issue by using a default setting with respect 'unique' keys. This default setting will only permit caching of those records that are specified by a 'unique' key, which identified through the Database Meta Data available from JDBC. Additionally, it is possible for a developer to define a unique key column (or set of columns) through a startup init file or through the runtime API. Only a developer with advanced system design understanding and high level programming skills should attempt to make such a modification, since this is a task that should only be done if instances to be stored in the cache through the map are truly unique.

The CocoBase system is designed to manage the cache by using a unique key, or the key column(s), as the unique identifier in looking up instances and then stores the instances in a Java Properties Object with the unique key as the identifier. With this design, if two duplicate records are retrieved from the database, only one instance will be preserved in the Properties based cache. The CocoBase is not designed to create uniqueness or to enforce uniqueness for database tables that do not have unique index defined. Because of this, the CocoBase system is designed to ignore an attempt to create caching or to use caching if a unique primary key has not been defined in the database, or a unique key is over-ridden by the developer by their software application design.

The CocoBase system is designed to allow non-unique objects to be accessed just as in ordinary database accesses where the CocoBase system is not used. However, the use of as caching is not turned on for those Objects. If a database table doesn't define a unique key, the Objects simply get passed through the CocoBase plug-in without caching becoming involved. However, a developer can easily take advantage of CocoBase plug-in caching even if a database table does not use a 'unique' key column set, by simply defining their own unique key for the database table.

Developers can look at the cocoKeyBundle.properties startup init file to see how the CocoBase system provides an ability to dynamically define a Unique Key. Also, developers can review the cocoDemocache.java file portions related to the CocoBase connect( ) methods format and commands, for an example of how a developer can easily define an Object Unique key through the use of the Mapping server CBSET-CACHEKEY functionality.

Design of the CocoBase Sample Optional Mapping Server Object Caching

As described above in several text locations, there are two sample Caching plug-ins included in the CocoBase system distribution and the design of each plug-in is bid different. One plug-in is a "Cache only" plug-in with the file name cocoserversamplecache.java, but the other plug-in named cocoserversamplecache.java is designed to provide a combined caching and connection pooling.

The cache portion for each plug-in is basically identical to one another, and the cache design is fairly intelligent with respect to caching systems. The cache portion of the plug-in keeps a rollback log for each client that is using the cache (a private cache) which is integrated with the shared cache upon the completion of a successful commit that updates the datasource. If the cache setting of AUTOCOMMIT is used, the caching system of the plug-in is designed to automatically integrate the changes to the private cache into the shared cache after each operation is completed that changes the private cache.

The cocoserversamplecache plug-in is loaded as the default plug-in for the script startcache.{bat/sh}. The other plug-in is used by substituting the script startcachepool.{bat/sh} and cocoserversamplecachePool is loaded as the CocoBase system plug-in instead of the default cache plug-in.

The caching portion of the plug-in is also designed to support some administrator control functions for starting, stop, and managing the cache. Additional features may be added by modifying the source code that is provided as part of the CocoBase system. The cache plug-in source code described herein (and to be released after the filing of this document) supports (among other things) the administrator control functions of CBSTARTCACHE, CBSTOPCACHE and CBSET-CACHEKEY, which can be used by a developer to set a caching system design that will start and stop the shared cache, as well providing the ability to override the primary key column(s) used at a resource to lookup Objects in the cache.

The cache plug-in source code does not need to be modified to manage transactional coordination or regulate cache memory size management. Cache system design is easily configured to solve such issues in a much more reliable fashion. Cache databases, for example, ODI and HYPERSONIC SQL each implement both manual and automatic mechanisms to trim the cache size on low memory availability. Other cache management features are provided by server monitoring capabilities, such as the multiple database synchronization capabilities of Weblogic 6.1, as described earlier. If the cache database and the main database are both registered with the Weblogic 6.1 server (or other application servers having similar monitoring capabilities), the transactional capabilities of the server can be harnessed to manage synchronization of the cache database with the primary database in coordination with the CocoBase system and fully implement the cache plug-in features of CocoBase for enhanced system performance.

Optional Mapping Server Definitions and CocoBase System Integration

The CocoBase Optional Mapping Server is designed to integrate into and interoperate with standard Application Servers whose users need to have database access. The CocoBase runtime and Optional Mapping Server can be used to provide persistence and mapping functionality to the overall system irrespective of the type of object programming application server that is chosen to be utilized for a particular computer system.

Generally speaking, application servers enable corporations to develop, deploy, and manage business-critical applications that frequently need to have transactional coordination capabilities. Object programming applications that run under such servers can delegate certain functions, such as the transactional coordination to the server.

Many sound reasons exist for developing applications that can run under such servers and can utilize the CocoBase database access features for development and deployment. A few of those reasons are high performance, rapid development, scalability, easy integration with existing enterprise systems, state management, load balancing, and table/row locking mechanisms. Such features can be the keys to good html and Jave Server Pages (JSP) creation that can interface well with a user and permit the user to access to data and to conduct transactions that implement important features of the server system and the CocoBase system that are invisible to the user. Examples are the server transactional coordination and the CocoBase runtime and caching systems. Such software application programs can be developed to delegate the functions of database access and data persistence to the CocoBase system, without the need to include database specific or persistence specific code in the application program source code. Moreover, CocoBase can automatically generate the server connectivity source code and persistence source code from the database maps.

CocoBase leverages the functionality of the Optional Mapping Server and features of application servers to provide additional advance mapping functions—typically the weakest link in Application Servers. CocoBase has become the pre-eminent mapping technology in Java, and provides superior mapping that can be readily utilized with virtually any mapping server as part of the overall system design. Application servers should be thought of as very complimentary technology to the CocoBase database mapping features, the CocoBase mapping server, CocoBase cache plug-in features, CocoBase runtime SQL generation facilities as well as other functionalities of the CocoBase software system product line.

Connection Pooling Systems with the Optional CocoBase Mapping Server

Connection pooling may be described as the concept of keeping database connections open and re-using them with new clients. Since it can be a resource intensive prospect to open a new database connection it is often advantageous to reuse existing database connections when possible, and to even use cached objects that are obtained from an earlier access of the database. A connection pool can be created for multiple clients. It keeps the connection to the database open for future requests. Creating a pool of JDBC connections gives clients ready access to connections that are already open. Connection pooling can improve performance by removing the overhead of opening and closing a new connection for each database operation or each time a new user tries to access the same database.

The connection management service of CocoBase can determine whether a database query can use a connection from the connection pool based on data source, user name, password, and the logged-on user account, etc. The connections in the pool can be shared among any users who can successfully match the login requirements. With this system design, each member client can get a connection from the pool for use, and then return it to the pool when finished (but the connection itself is not closed).

To configure the connection pooling of the CocoBase system, the developer can simply edit the Pool configuration file to set the desire connection pooling requirements (the file cocoPoolconfig.properties). Both the cocoserversample-connectionPool.java example plug-in and the cocoserver-samplecachePool.java example plug-in are designed to utilize this property file in order to configure the system Connection Pooling. The source code of each Connection Pooling plug-in can be readily customized to meet any project requirement not covered automatically in view of the discussion and description provided herein.

CocoBase System Optional Mapping Server Overview

CocoBase provides a solid infrastructure to allow easy user plug-ins for state management, load balancing, caching, connection pooling, etc. Because the focus of this server is on mapping, it can be referred to as an Optional Mapping Server. Such a mapping server it is designed to tie together different data base driver systems, and provide transparent and consistent use of those systems for an application developer. Another good use of such a system it to permit the easy transport of data from one data system to another, as described above in detail.

In one implementation, the CocoBase Optional Mapping Server is designed as an ORB Service loaded into the CORBA ORB. In such a case, each mapping server is fully multi-threaded and capable of supporting many simultaneous users. The CocoBase Optional Mapping Server also provides access to and transparent use of JDBC and either CORBA or RMI with 3-tier CocoBase adapters to the Mapping Server, without requiring application developers to understand or to program in either of those driver systems. The CocoBase System also provides applications with an added level of security that is not possible from Internet enabled JDBC drivers.

The CocoBase system runtime, data caching, object caching, and mapping features can be readily utilized by a developer to achieve a very scalable and high-performance data access and mapping system. This is accomplished by minimizing I/O between the client and server, in a fully multi-thread multi server architecture. The developer can permit client applications to decide when and where and how much data is sent between the client and server. This means the system does not need to burden down data pipes with irrelevant information or with lots of small independent network requests. Because less I/O is used, a system can be designed which utilize the same data bandwidth to support many more users with the CocoBase system implemented than it could have supported in the absence of CocoBase.

Optional Mapping Server Security with CocoBase System

Object programming applications can delegate database accesses to CocoBase runtime and mapping repositories to create increased security on computer systems. This can be particularly helpful when the system is connected to the internet or other open connections. Applications that interface with uses are more secure if they have been written to utilized the CocoBase system and to delegate the database accesses to CocoBase. In such a case, clients (system users and application software) access the optional mapping server through a CocoBase map. Each map explicitly specifies each table field and where conditions associated with available operations, and the client does not have access to the underlying database driver. This can be utilized to restrict the data that can be access by a particular client. The CocoBase System provides this additional security because database access is done through the list of maps available to a particular user, and the client or application software does not have direct access to the underlying database driver and therefore to data other than that available through the list of maps.

The CocoBase system is designed to provide this additional layer of remote security by providing a list of maps to which a particular user is granted access. Even this security feature can be easily extended by customizing the source code of the Optional Mapping Server Plug-in.

The CocoBase Optional Mapping Server model does not place SQL in client applications (which reduces rogue client capabilities). Instead, the runtime libraries of the CocoBase system as described at length earlier above. The CocoBase runtime libraries in combination with the pre-defined maps manage all SQL access to the data source through the Mapping Server and predefined Maps. An implication of this design means is that if a given CocoBase map, an operation within a map, or an attribute within an operation isn't published to the client, it does not exist from the perspective of the client.

By contrast, the CocoBase Relational 2-tier system sits directly on the JDBC driver instead of utilizing the mapping server and the runtime maps, and the 2-tier system does not possess the same security mechanism. In such a system, the CocoBase 2-tier runtime libraries permit a getconnection( ) call, which returns information necessary to access the system JDBC driver. As a result, it's not possible to provide additional security over JDBC if such a 2-tier system is employed. Many system that are not truly an "O/R" system in that they are not fully delegated the control of database assess have the same problem. In such a system, security will be limited to whatever security is provided by the JDBC driver and the associated database, such as database login protocols and the like. Such login protocols can be limited. Typically, if a database user has the right to can log into a database, then all of the data in that database is accessible to that user. This can require a system design of multiple databases where part of the data is duplicated, which can be hard to keep synchronized and uses additional storage resources.

In view of these additional security features due to the CocoBase system design, developer that need to provide access over the Internet should use a 3-tier CocoBase adapter and the associated mapping server. The CocoBase Relational 2-tier system and other similar systems may be sufficient mainly for Enterprise 2-tier Intranet application development. However, even in such systems it may be desirable to have a single database where certain data needs to be secure from access by some system users. The Optional Mapping Server provides applications an added level of security not possible from Internet or Intranet enabled JDBC drivers. Due to the security design flaws present with typical JDBC drivers, and the concept of permitting a JDBC driver is to pass arbitrary SQL from client applications to back-end server systems, it can be difficult or virtually impossible to secure JDBC systems for Internet or Intranet use without the use of the CocoBase 3-tier system of delegated database access.

The CocoBase system may also be described as having architecturally secure design that works on the 'publish paradigm' with the server managing and publishing all access to SQL on the database server. Client access is restricted to only those defined maps, which are published as being available from the Mapping Server. With this Map focused design, the CocoBase Enterprise 3-tier system (with its delegated database access features) allows companies to pre-define maps that can be executed by clients, instead of allowing clients to define or change the SQL statement that the server is capable of executing. Through adapting the CocoBase plug-in source code, developers can easily integrate/extend the components for providing additional security, and to delegate security and project specific logic to the CocoBase system.

Maps and objects related to those maps can be created in a number of ways, usually in response to application users requests. Accordingly, the system of the present invention will have to accommodate such numbers of objects and maps associated with those objects. Because of the flexibility of the present system, maps can be bonded to objects dynamically (during the application run time). The result will be that a single map could be appropriate for a plurality of objects. On the other hand, a single object may be bonded by a plurality of maps. Objects that can be used to access large volumes of data, the use of any particular map may initiate a data response so large that it cannot be easily managed. Accordingly, single object may have a number of different maps each configured to access only a particular portion of the data associated with the selected object. In this manner, maps can be used to select only that data which would be relevant to the map user. This selectivity will render a large volume of data associated with a particular object to be more manageable for access and use. Likewise, the distributed of selected maps to access only selected portions of the datastore associated with a particular object can be used in as a security device. In this manner, individuals are provided with maps having the capability of accessing only those portions of the database that are appropriate for the map user. Thus, the selection and distribution of maps for a particular object can serve as a security hierarchy with respect to the data to be made available.

The dynamic mapping of the present invention can be applied where a Java object provides translation by mapping such an object to first data source (either relational or object) can also by mapping such an object to an XML for a second format database. This arrangement allows greater control as to how the data steps are exchanged, filtered, and validated by exchanging data.

While a number of preferred embodiments of the present invention have been discussed by way of example, the present invention is not to be limited thereby. Rather, the present invention is to be construed as including any and all variations, modifications, permutations, adaptations and embodiments that would occur to one skilled in this art once having been taught the present invention.

We claim:

1. A local or distributed computer system comprising a user interface, a working memory storage area and at least one device for permanently storing information, wherein a portion of said memory of said system is loaded with at least one portion of a computer software program containing logic for accessing data in a first data source having a first particular data structure and having a particular corresponding structural schema and the logic for creating or maintaining all or a portion of such data in at least one second data source having the same or a different data structural schema, wherein:

(a) at least one of the data sources is an object data source store or is data encapsulated by data objects located within an object application program, wherein the data objects are organized by a discernable organizational structural schema or are capable of being organized by an organizational structural schema, (b) the computer system comprises a mapping system that includes logic for accessing each schema corresponding to a different data source accessible to the mapping system, and the mapping system may further include logic for generating a structural schema for one or more data sources when a schema is absent or is unavailable to the mapping system, wherein repository maps are organized according to at least one navigation model or schema, or the mapping system provides an interface and software logic for organizing or reorganizing repository maps and data objects according to at least one navigation model or schema, (c) the mapping system comprises software logic capable of correlating, of translating, or of both correlating and translating, all or a portion of the data located in each of the different data sources that is being created or is being maintained by the mapping system, and (d) the mapping system comprises a mapping repository that includes metadata, or includes software logic for accessing metadata, wherein at least a portion of the metadata defines relationships between two or more data objects located in a data source or located in an application program capable of being run on the computer system, and wherein:

the one or more object programming applications capable of being run within the computer system are tailored to delegate both the accessing of a data source and the generation of SQL strings to a runtime library repository, which repository can access the database directly or through a database driver, such as a JDBC driver, without the need to imbed specific database accessing mechanisms in the application code.

2. A local or distributed computer system according to claim 1, wherein the mapping repository further comprises software logic, or access to software logic, for resolving mismatches between the data schema for one or more data sources and the data schema for two or more data objects located within an object application program that is running within the computer system, or in an object application program that is capable of being run within the computer system.

3. A local or distributed computer system according to claim 2, wherein multiple schema maps can exist for a single data object and multiple objects can use a single map that is located in the mapping system repository.

4. A local or distributed computer system according to claim 2, wherein the mapping repository includes one or more items selected from the group consisting of maps of database schemas, object definitions, other programming definitions or parameters, object metadata, database settings, and complex relationship definitions.

5. A local or distributed computer system according to claim 4, wherein the mapping repository includes one or more items selected from the group consisting of maps of database schemas, object definitions, other programming definitions or parameters, object metadata, database settings, and complex relationship definitions.

6. A local or distributed computer system according to claim 1, wherein the object application program which contains two or more data objects wherein metadata accessible by the mapping repository defines relationships between the two or more data objects, may be run independently as an applet, as a stand alone application program, as an application program or service within an object program application server system, or may be capable of running in two or more of the these types of programs.

7. A local or distributed computer system according to claim 1, wherein one of the data sources is a relational data source, is an object data source, or is an XML data source.

8. A local or distributed computer system according to claim 7, wherein one of the data sources is an XML data source.

9. A local or distributed computer system according to claim 1, wherein one or more of the data sources is located in transient memory of the computer data system and can be persisted to a non-transient memory data source.

10. A computer system according to claim 1, wherein the mapping system portion is designed to provide different maps for particular objects to different users and does not permit direct access of computer system users to JDBC drivers for any mapped data sources of the computer system, and wherein this mapping system provides varying levels of access to the mapped data sources for at least two different users of the same system, whereby a user only has access to a particular list of maps that are available to the security level of that user.

11. A computer system according to claim 1, wherein the mapping system portion is designed to provide to a system user who is accessing, creating or updating maps, or accessing objects on a system to make data changes related to a particular object and to promulgate the changes to that object as either local or global changes on the computer system.

12. A computer system according to claim 11, wherein the mapping system portion provides an interface permitting an authorized user to edit or create the tables, fields, or attributes of a data map for an object as a table format or XML file format without requiring the user to have extensive knowledge of a particular relational database as a source of the data, or extensive knowledge about how to directly access that relational database.

13. A local or distributed computer system comprising a user interface, a working memory storage area and at least one device for permanently storing information and a mapping system and the system having a portion of said memory loaded with at least one portion of a computer software program containing logic for accessing data in a first data source having a first particular data structure with a particular corresponding structural schema and the logic for creating or maintaining all or a portion of such data in at least one second data source having the same or a different data structural schema, wherein:

(i) at least one object programming application running within said system is tailored to delegate both the accessing of a data source and the generation of SQL strings to a runtime library repository, which repository can access the database directly or through a database driver, such as a JDBC driver, without the need to imbed specific database accessing mechanisms in the application code, and (ii) the mapping system of said computer system provides an interface and features that permit a user to access, create, or update the metadata of a map as a dynamic computer system update, without requiring the user to either open a new connection to the data source or to restart an object application program that is running while the user is dynamically evaluating or changing metadata for a map, and wherein the metadata of a map that a user can dynamically evaluate or change includes a map description of data or relationships between data, and wherein such map description is at least one member selected from the group consisting of a data source relationship, a relationship between at least two objects of an object application, and both a data source relationship and a relationship between at least two objects of an object application.

14. A local or distributed computer system according to claim 1, further comprising a fully synchronized caching system that synchronizes the caching of a delegated data source access management object to relational mapping layer and the transaction coordination facilities of an application server, and the computer system comprises (i) a first data source referred to as the primary data source, (ii) a second data source referred to as the cache data source that is associated with an object to relational mapping layer to provide a data source cache for object applications, and (iii) a server having a transaction coordinator with the ability to register multiple data sources, wherein: (a) both the primary data source and the cache data source are registered with the transaction coordinator facilities of the server, and (b) the cache data source acts as secondary data source to speed up data accesses for an object application and the cache data is plugged into the object to relational mapping layer, and (c) registration of the cache data source with the transaction monitor of the server provides the feature that any changes to the cache will automatically be synchronized with the primary data source or record upon transaction completion, including commit or roll-back of changes for both data sources, and optionally, wherein the transaction monitor of the server calls the mapping system and in the call to the mapping system delegates accessing or updating of data in the data sources registered with the transaction monitor, such that the transaction monitor does not complete a transaction until it is notified by the mapping system that a data source has been updated by the mapping system in order for any changes to the cache to be automatically synchronized with the primary data source or record upon transaction completion, including commit or roll-back of changes for both data sources.

15. The computer system of claim 14, wherein at least one cache data source can be set up as a memory-resident entire database, as a disk resident database, or as both a memory resident database and disk resident and in each case the cache data source is synchronized with the transaction monitor of the server, and optionally wherein at least one cache data source is a memory resident database that is a portion of a disk resident database and the size of the memory allocated for the memory resident database can be set by the user of the computer system, or can be automatically allocated by the system according to pre-set protocols.

16. The computer system of claim 15, wherein the at least one cache data source is adapted to cache at least one member selected from the group consisting of data from a data source, a source structure map, an object or object definition, metadata, object schema, an object schema, and an XML file which defines or describes a member selected from the group consisting of data from a data source, a source structure map, an object or object definition, metadata, and an object schema.

* * * * *